United States Patent
Hyers

(10) Patent No.: US 10,363,642 B2
(45) Date of Patent: Jul. 30, 2019

(54) LOCKING CENTERING MECHANISM

(71) Applicant: Carson Optical, Inc., Ronkonkoma, NY (US)

(72) Inventor: Michelle Hyers, Hicksville, NY (US)

(73) Assignee: Carson Optical, Inc., Konkonkoma, NY (US)

( * ) Notice: Subject to any disclaimer, the term of this patent is extended or adjusted under 35 U.S.C. 154(b) by 176 days.

(21) Appl. No.: 15/397,049

(22) Filed: Jan. 3, 2017

(65) Prior Publication Data

US 2017/0190010 A1     Jul. 6, 2017

Related U.S. Application Data

(60) Provisional application No. 62/274,480, filed on Jan. 4, 2016.

(51) Int. Cl.
| | |
|---|---|
| *B23P 19/04* | (2006.01) |
| *B23Q 3/18* | (2006.01) |
| *B23B 31/12* | (2006.01) |
| *B25B 5/04* | (2006.01) |
| *B25B 5/08* | (2006.01) |
| *F16B 2/10* | (2006.01) |

(52) U.S. Cl.
CPC .......... *B23Q 3/183* (2013.01); *B23B 31/1261* (2013.01); *B25B 5/04* (2013.01); *B25B 5/08* (2013.01); *F16B 2/10* (2013.01)

(58) Field of Classification Search
CPC . B23Q 5/00; B23Q 5/06; B23Q 5/142; B23Q 5/26; B25B 5/00; B25B 11/00
See application file for complete search history.

(56) References Cited

U.S. PATENT DOCUMENTS

| | | | |
|---|---|---|---|
| 1,370,705 A | 5/1919 | Harry | |
| 2,612,809 A | 7/1952 | Shager | |
| 4,938,489 A | 7/1990 | Nemirovsky | |
| 5,201,501 A | 4/1993 | Fassler | |
| 6,458,022 B1 * | 10/2002 | Folz | B23Q 1/76 |
| | | | 269/196 |
| 8,286,955 B2 * | 10/2012 | Damang | B23Q 1/76 |
| | | | 269/165 |
| 8,371,623 B2 | 2/2013 | Bronnert | |
| 9,442,349 B2 * | 9/2016 | Hyers | F16B 2/10 |
| 9,969,039 B2 * | 5/2018 | Maurer | B23Q 1/76 |
| 2005/0050702 A1 | 3/2005 | Green | |
| 2008/0139092 A1 * | 6/2008 | Lessway | B23Q 1/76 |
| | | | 451/408 |

(Continued)

FOREIGN PATENT DOCUMENTS

| | | |
|---|---|---|
| CN | 200967089 Y | 10/2007 |
| DE | 0225984 A2 | 6/1987 |
| DE | 3717091 A1 | 8/1988 |

*Primary Examiner* — Lee D Wilson
(74) *Attorney, Agent, or Firm* — Carmody Torrance Sandak & Hennessey LLP

(57) ABSTRACT

A centering mechanism for retaining an object, wherein the centering mechanism has a locking mechanism, having at least a first tangential surface. Furthermore, the centering mechanism can be used in conjunction with a mechanism for retaining an electronic device or an electronic device in a case. The structure of the centering mechanism and the locking mechanism allows for the locking mechanism to further actuate and lock the centering mechanism, such that an object retained therein is secured and aligned.

32 Claims, 22 Drawing Sheets

(56) References Cited

U.S. PATENT DOCUMENTS

2010/0187740 A1\* 7/2010 Orgeron ................. B25B 5/061
  269/218
2010/0252976 A1\* 10/2010 Damang ................. B23Q 1/76
  269/165
2013/0148273 A1 6/2013 Tsai \* cited by examiner

LOCKING CENTERING MECHANISM

BACKGROUND OF THE INVENTION

The present invention relates generally to a centering mechanism, wherein an object can be retained in the centering mechanism, and further clamped using a locking mechanism, having at least a first tangential surface. In particular, a centering mechanism with at least two retaining members, wherein the locking mechanism can actuate and lock at least a portion of the centering mechanism to provide additional force to retain an object. Furthermore, the present invention is also directed to the means to integrate a centering mechanism having a locking mechanism with a mechanism to retain an electronic device.

Centering mechanism are used to hold and align an object, having a circular, cylindrical, square or any object with at least axis of symmetry in a cross-sectional plane, such that the center of the object is approximately aligned with an alignment axis or plane of the centering mechanism. The fields of use of such centering mechanism are most popular in the areas of manufacturing, assembly, optics, and electronics. In manufacturing and assembly, there are centering or self-centering clamping mechanisms or centering grippers that retain and object for reliable placement for manufacturing or assembly purposes (U.S. Pat. No. 8,286,955). In optics, there are devices to center and retain lenses for testing or assembly purposes (U.S. Pat. No. 4,938,489, or US Publication 20150167707). Also, there are locking mechanisms, having at least a first tangential surface used for various purposes, as retaining an object (U.S. Pat. No. 8,371,623), however the prior art does not teach a centering mechanism which also includes a locking mechanism that further at least retains, actuates further aligns the object or a combination thereof.

Notwithstanding all the known methodologies and construction for a centering mechanism or a locking mechanism having at least a first tangential surface, however, it is believed that still further advancements in the art are achievable. In particular, the current a centering mechanism utilizing at least one locking mechanism, such that the centered object is locked but still in an aligned position. Accordingly, it is desirable to provide a construction and methodology of a centering mechanism having a locking mechanism, that overcomes the foregoing deficiencies in the prior art as well as achieves the aforementioned and below mentioned objects and advantages.

OBJECTS AND SUMMARY OF THE INVENTION

Accordingly, it is an object of the present invention to provide an improved centering mechanism for an object that includes a locking mechanism.

It is a particular object of the present invention to provide an improved centering mechanism which can be actuated by use of a locking mechanism, so as to provide an additional clamping force on the retained object.

It is yet another object of the present invention to provide a centering mechanism that can be used in conjunction with a mechanism to retain an electronic device.

It is still another object of the present invention to provide an improved device for aligning the electronic device to the centering mechanism using a variable pitch screw.

Yet a further object of the present invention is to provide an improved centering mechanism and a clamping device for electronic device which are more intuitive and easy to use compared to prior art.

Still another object of the present invention is to provide integration of the aforementioned centering mechanism and clamping device in the form of an adapter.

It is yet another object of the present invention to provide an improved method of a centering mechanism, and a clamping device for retaining an electronic device.

Further objects and advantages of this invention will become more apparent from a consideration of the drawings and ensuing description.

The invention accordingly comprises the features of construction, combination of elements and arrangement of parts and sequence of steps which will be exemplified in the construction, illustration and description hereinafter set forth, and the scope of the invention will be indicated in the claims.

BRIEF DESCRIPTION OF THE DRAWINGS

Like reference numerals in the various Figures illustrate like parts, but not every part in every figure is so identified.

DETAILED DESCRIPTION OF THE PREFERRED EMBODIMENT

As set forth in the Background Section above, and as will be appreciated below, the present invention is primarily directed to a centering mechanism, with an actuating locking mechanism. It will be made clear from the below description of the construction of each device, that each device is unique and not obvious in view of existing prior art.

Figure 1:
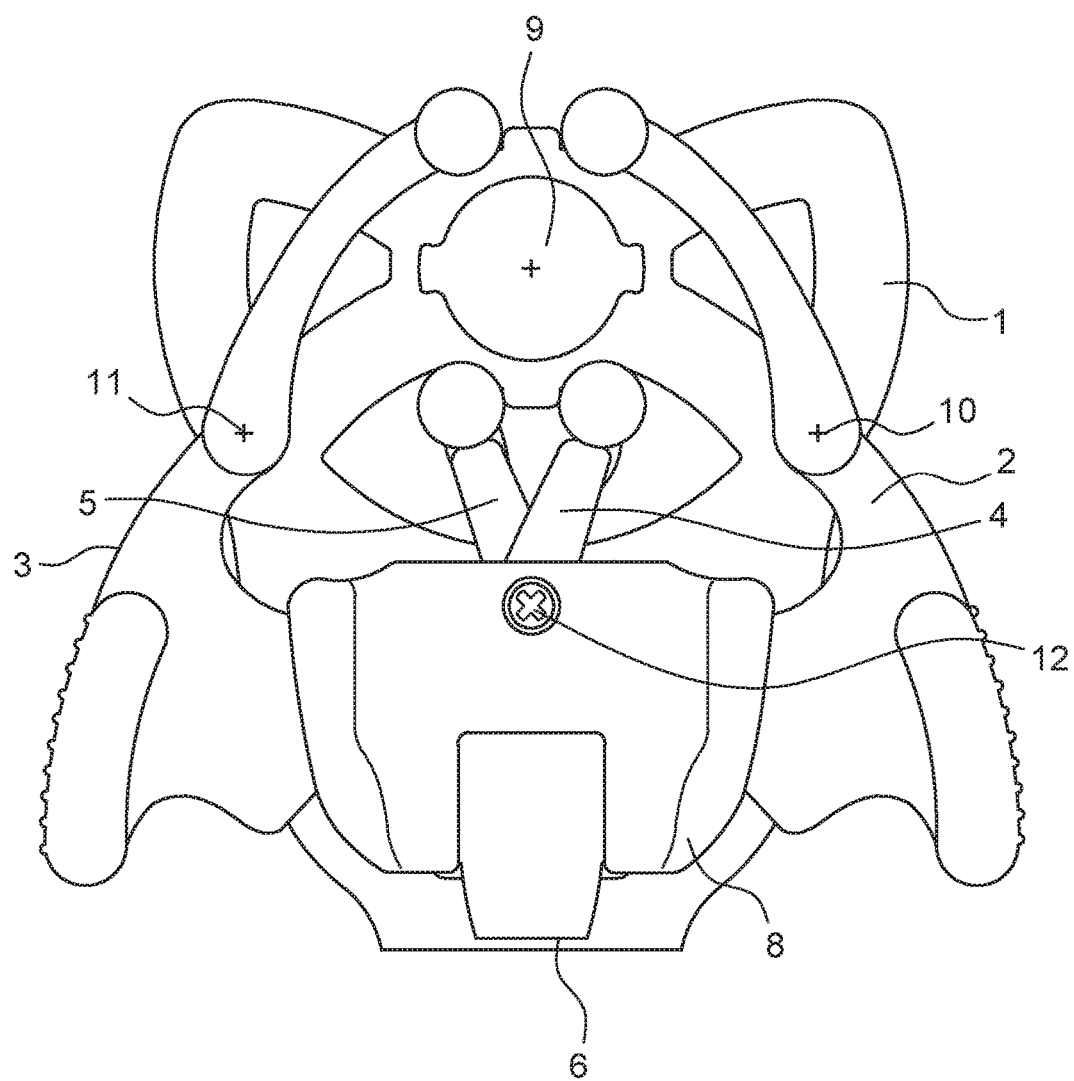
FIG. 1 is a top plan view of a first preferred embodiment of the centering mechanism constructed in accordance with the present invention.

The first preferred embodiment of the centering mechanism depicted in FIG. 1, having a main body 1 and at least two retaining members 2, 3. There can be at least an additional two other retaining members, 4, and 5. Each retaining member is rotatable around its respective but not necessarily unique pivot axis, for example, retaining member 2 is rotatable about axis 10 but both retaining members 4 and 5 can pivot about axis 12. In the ideal construction, these pivot axes of each of the retaining members in this embodiment are at least approximately mutually parallel. In this preferred embodiment, each retaining member can have at least a first tangential member and at least one end, such that at least the first tangential member of the first arm moves in a tangential manner with at least another one of the other arm's tangential members. The geometry of each of the first tangential members of at least the first, second and third retaining members are such that at least the first end of at least the first, second, and third retaining members move in a self-centering manner about the fixed alignment axis 9, so that the center of any one of a plurality of differently sized objects can be aligned to the same fixed alignment axis. One or more centering members 7 can be coupled to or integral with at least one of the retaining members. The result of such a design with the described retaining members and centering member is a self-centering mechanism that can retain an object having a center and at least one cross-section with at least two axes of symmetry.

In the preferred embodiments of the locking mechanism, there is a single locking mechanism show of various forms. However, there can be more than one locking mechanism of varying or similar types used in conjunction. This could be advantageous for many reasons, but for example, to additional reinforce the locking functionality, or provide different user interfaces to achieve a locking effect such as from different orientations of the centering mechanism for ergonomic concerns. Also, there can be one or more centering members, such as by a single member or multiple members that act together to produce a coordinated centering effect, or multiple members wherein the centering functionality may only be redundant in some of the member. In the preferred embodiments, only a single centering member is depicted, yet even the single member shown could be made from multiple components. The locking mechanism in the presented embodiments engages with at least the first centering member, but could also engage with at least one of the retaining members to produce a similar locking effect. The advantageous aspect of utilizing a centering member or another member that is not the retaining member is that such pressure can be distributed more uniformly or symmetrically over more than one retaining member, and also allows for the retaining members to have a simpler design that is not fully mechanically connected to the other retaining members. Most importantly, by utilizing at least a first centering member to engage with at least the first locking mechanism, the locking mechanism is capable of not only pinning the centering mechanism in the current position but further actuating the centering mechanism to a more closed state, which helps further clamp down on the retained object. Therefore, in the preferred embodiments, engagement is shown with the centering member, but alternatives can be used for engaging with the retaining members.

Figure 2A:
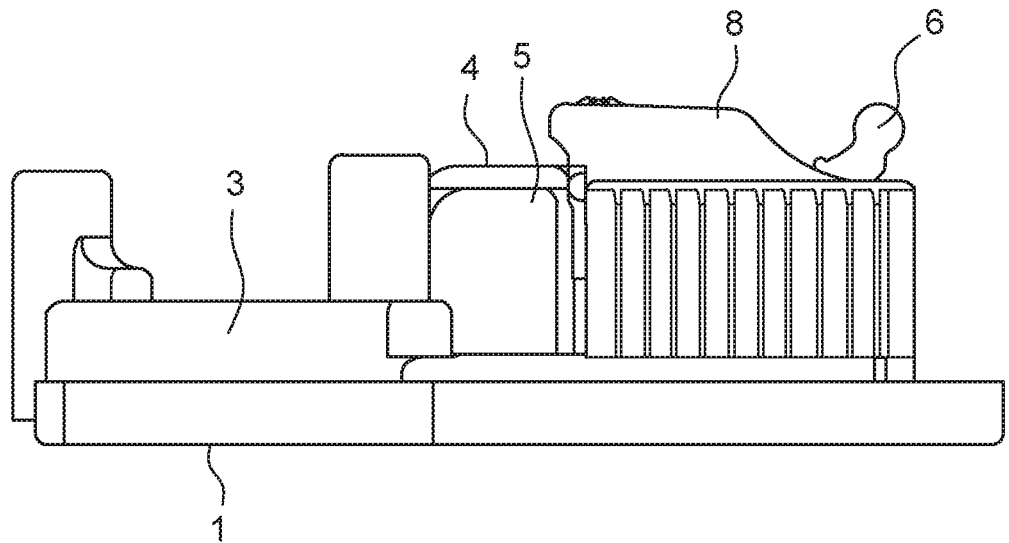
FIG. 2A is a right side view of a first preferred embodiment of the centering mechanism constructed in accordance with the present invention depicting the locking mechanism in a first unlocked state.
Figure 2B:
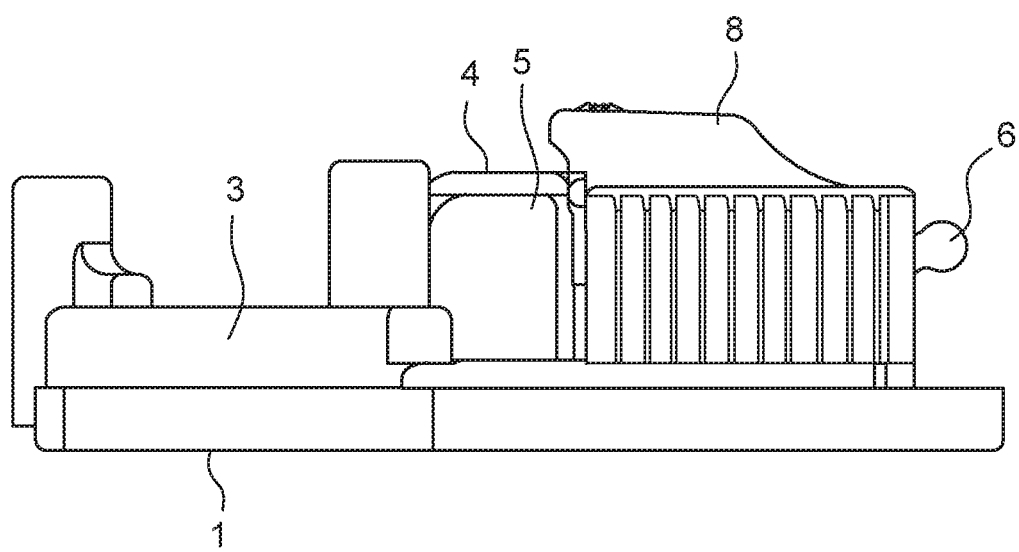
FIG. 2B is a right side view of a first preferred embodiment of the centering mechanism constructed in accordance depicting the locking mechanism in a first locked state.

In this first preferred embodiment, four retaining members 2-5 are shown wherein the third and fourth retaining members are coupled via a centering member 7. In the preferred embodiment, the locking mechanism can pivot relative to the main body as shown in FIG. 2A in a first locked state or in FIG. 2B in a first unlocked state. At least the first locked state and the first unlocked state, do not necessarily require a full locking or unlocking of the centering mechanism, but refer to at least two discrete states of the locking mechanism itself, wherein there is at least some pressure on the mating cam member in at least a first locked state, and none or limited pressure on the mating cam member in at least the first unlocked state. There could also be additional discrete or continuous locking, unlocking or other states, depending on the specific design of the locking mechanism. For example, these additional states could be configuration states corresponding to different sized objects retain within the centering mechanism, such as small sized items may be desired to retained with larger pressure than large sized items or vice versa. In this embodiment the mating member to the locking mechanism is the centering member 7. The first locked state of the locking mechanism, may optionally lock a portion of the centering mechanism, or further actuate the centering mechanism and retain at least a portion of the centering mechanism in a fixed position or in frictional engagement. Alternatively, the first unlocked state of the locking mechanism can optionally allow free motion of the centering mechanism or partially restricted motion of the centering mechanism. Furthermore, the locking mechanism need not have at least one discrete locked or unlocked state, where instead the locking mechanism is used as a ratchet or to produce a ratcheting-like effect, to actuate the centering mechanism. The locking mechanism may ratchet the mechanism closed with each actuation of the locking mechanism, until it can be released back in to at least a first unlocked state either manually or automatically by another member of the overall centering mechanism. The first tangential surface of the locking mechanism would have ratchet geometry, and the centering member or additional members may have the mating pawl geometry. The ratchet and pawl surface would mate in a tangential fashion. In the preferred embodiment, the locking mechanism is a body with at least one tangential surface rotatable about an axis, and having a single action lever design with three states. The preferred tangential surface is one having cam geometry that mates with at least one surface of the centering member, either directly or indirectly by means of additional members.

The locking mechanism can also be designed to either travel with the center member or stay in a fixed position relative to the main body by an additional support member 8, which in FIG. 1-4 the latter example is depicted. Furthermore, snap-fits may be included on the additional support member, the locking mechanism or any other parts near the locking mechanism, so that an auditory clue is tied to at least one specific state of the locking mechanism, for instance a click noise. An auditory effect may also occur just from the natural engagement and release of the locking mechanism.

Figure 3A:
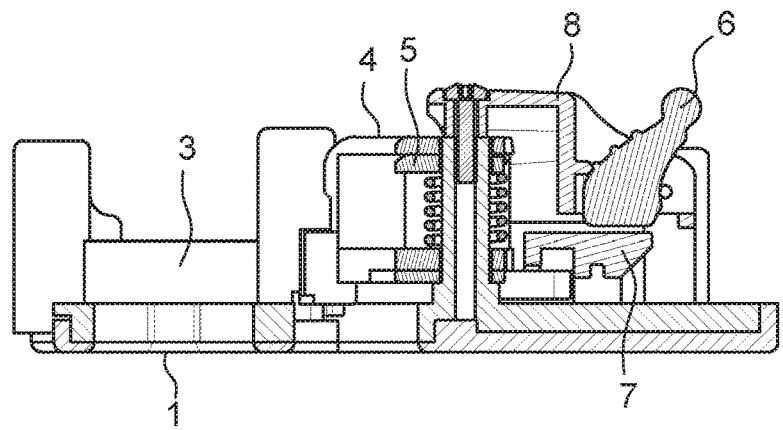
FIG. 3A is a sectional view of a first preferred embodiment of the centering mechanism constructed in accordance with the present invention depicting the locking mechanism in a first unlocked state.
Figure 3B:
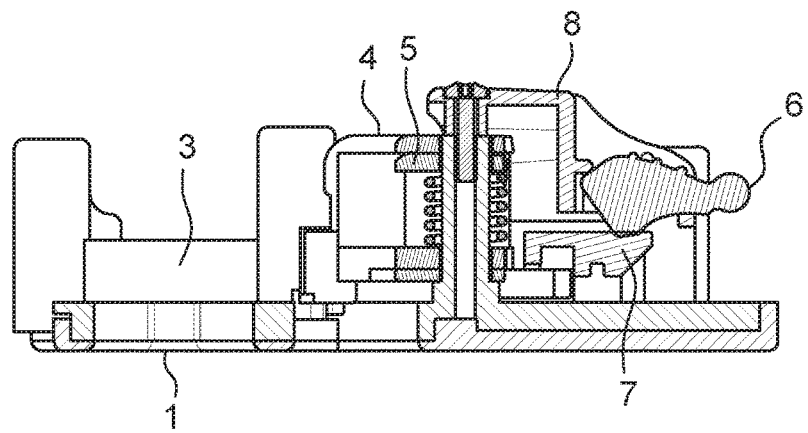
FIG. 3B is a sectional side view of a first preferred embodiment of the centering mechanism constructed in accordance with the present invention depicting the locking mechanism in a first locked state.
Figure 3C:
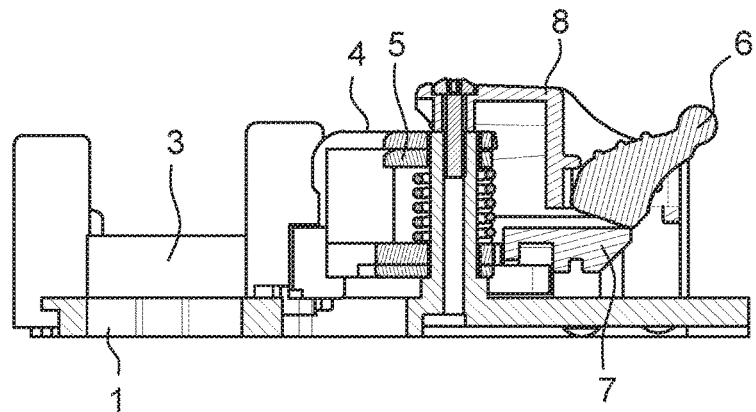
FIG. 3C is a sectional side view of a first preferred embodiment of the centering mechanism constructed in accordance with the present invention depicting the locking mechanism in a first transitional state.

In the preferred embodiment shown in FIG. 3A-C the centering member 7 has at least one planar surface, which is planar at least over a specific travel length of the centering member, and the first tangential surface of the locking mechanism has cam geometry. In this specific embodiment, the first planar surface of the centering member 7 is generally perpendicular to the rotational axis of the locking mechanism 6, but this planar surface can also be at a known angle to the rotational axis of the locking mechanism if this angle is account for in the cam geometry of the locking mechanism. Furthermore, the centering member 6 can also have a non-planar surface that has been design or optimized for specific cam geometry of the locking mechanism. This would allow one to use simpler cam geometry on the first tangential surface of the locking mechanism 6, but instead functionalize the centering member surface to produce the same cam geometry-based locking effect. To produce the ideal cam locking effect, at least one of the locking mechanism and centering member has to have at least one non-planar mating surface. The centering mechanism in this embodiment actuates the retaining members for centering, while the centering mechanism itself moves in a generally only a linear direction. Therefore, a locking mechanism 6 which rotates about a fixed axis relative to the main body, can not only lock the centering mechanism in its current position, but also further actuate the entire centering mechanism to a more closed state. While the centering mechanism is either in a clamped or partially clamped state on an object, the locking mechanism can cause the centering mechanism to further clamp on the object, and then secure the centering mechanism in a first locked state. Also, the mechanism can have at least one bias member such as a spring that biases movement of the centering mechanism towards the alignment axis. In this embodiment, the spring mechanism rotates about the axis 12.

In a sectional view, FIG. 3A shows that in a first unlocked state, the locking mechanism does not make contact with the centering mechanism, whereas in FIG. 3B the locking mechanism is in a first locked state and makes contact with the centering mechanism. In the first locked stated, the locking mechanism also provides a downward force on the centering member, so as to pin the centering member in place relative to the main body and can optionally move the centering member in a linear direction. Since the centering bar is mechanically connected to at least the third and fourth retaining member 4, 5 in this embodiment, the locking mechanism also holds fixed these retaining members as well in the first locked state. Additionally, if the centering member has portions which at least cover some part of at least the first and second retaining member in a first unlocked state, the downward pressure applied by the locking mechanism in a first locked state can also be used to fix the first and second retaining members in place as well. Thereby, in a first locked state, the locking mechanism and the retaining members can be designed such that all of the retaining members can be held in a fixed or immovable position, at least to a degree that a specific amount of force would allow them to move. The issue that a specific level of force on the retaining members can release the locking mechanism can be used for several advantages. For instance, the preferred embodiment of the centering mechanism can be manually actuated by using the first and second retaining members as levers. There could be a concern that a user could accidentally force the mechanism when trying to manually manipulate the centering mechanism out of at least the first locked state, which has the potential to cause damage to the mechanism. In such a case, the locking mechanism can be designed such that at a specific level of force applied to the first and second retaining members levers, so as to be analogous to the manually actuation method using them as levers, so that the locking mechanism automatically releases. Therefore the user would do the same action to actuate the centering mechanism in both a first locked and a first unlocked state, just that in the first locked state it may take a more substantial amount of force to overcome the clamping force provided by the locking mechanism. The cam geometry of the first tangential surface of the locking mechanism in relation to the other components can be achieved so as to provide the correct amount of force, such that accidental contact with the first and second retaining member does not release the locking mechanism, but intentional actuating of the first and second retaining member does release the locking mechanism. The ideal cam geometry for this embodiment need only actuate from a smaller diameter arc region, transitioning tangentially to a larger diameter arc region, wherein the diameter difference between the circular regions is 0.2-2.0 millimeters.

The locking mechanism 6 may be actuated with directly or indirectly by use of an additional component or mechanism, such as but not limited to one of more of the following: button, spring, spring loaded screw, lever, screw, linkage, or any combination thereof. The means to actuate the locking mechanism beyond the basic lever design can be selected from various methods known in the art, but the mechanism still at the basic level must include at least a locking mechanism to achieve the ideal dual locking and actuating function presented in the preferred embodiment.

Figure 4A:
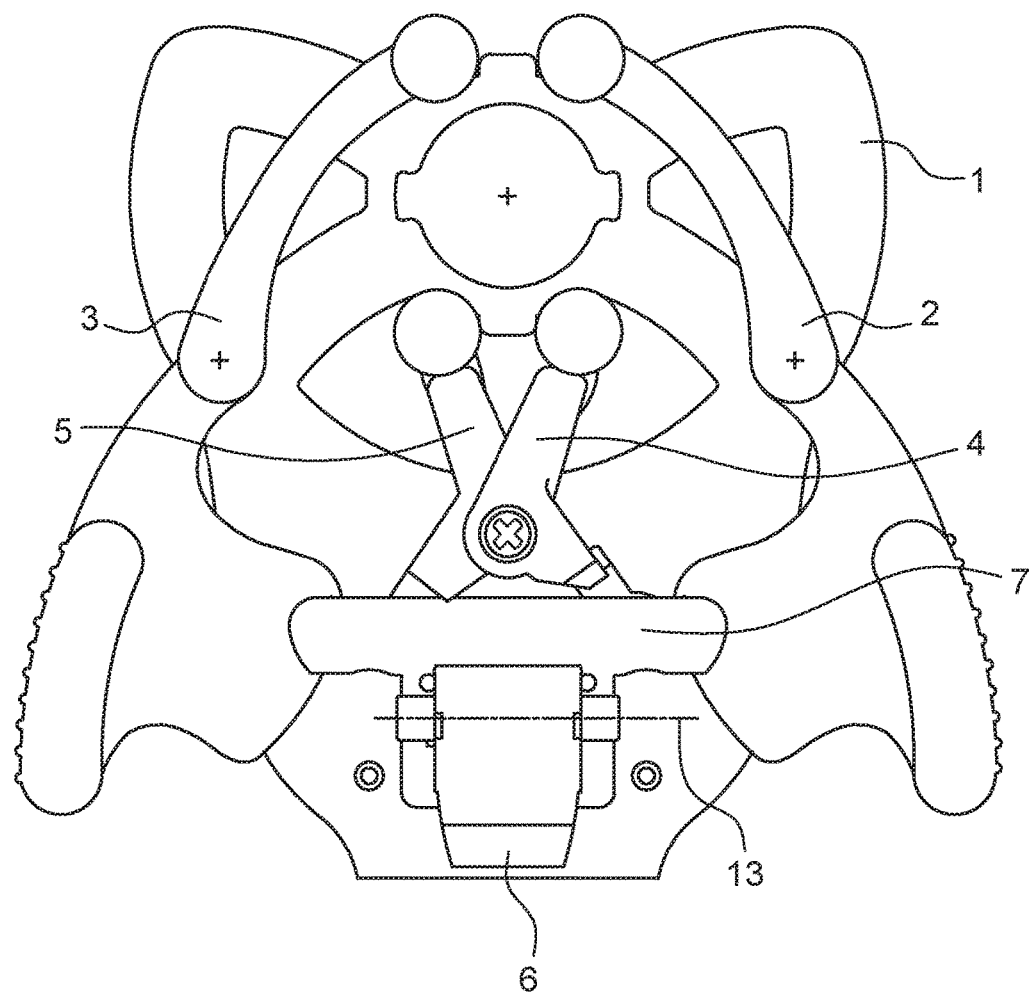
FIG. 4A is a top plan view of a second preferred embodiment of the centering mechanism constructed in accordance with the present invention depicting the centering mechanism in a first closed state.
Figure 4B:
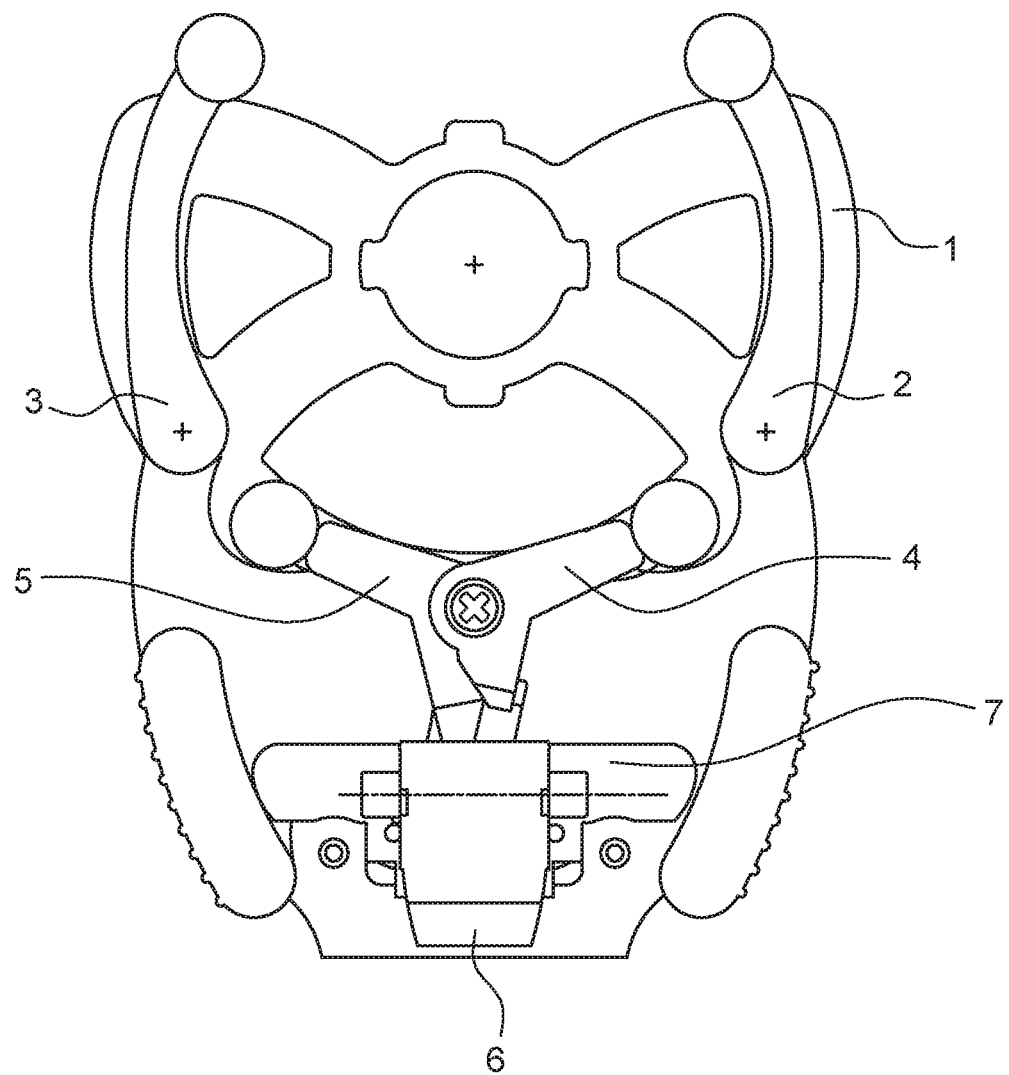
FIG. 4B is a top plan view of a second preferred embodiment of the centering mechanism constructed in accordance with the present invention depicting the centering mechanism in a first open state.

For example in FIG. 4A-B, the centering mechanism is shown without the additional support 8 for the centering member only for further clarification of the inner structure of the centering mechanism, as there must still be some structure to retain the locking mechanism for the mechanism to be functional. FIG. 4A depicts the centering mechanism in a first closed configuration, such that such that the smallest object size designed to be retained in the centering mechanism could be placed in the centering mechanism. FIG. 4B depicts the centering mechanism in a first open configuration, such that the largest object size designed to be retained in the centering mechanism could be placed in the centering mechanism. In this first open configuration, the centering mechanism has traveled, while the locking mechanism stays in a fairly fixed position, such that the locking mechanism can actuate on a different section of the planar surface of the center member. Moreover, such a planar surface construction of the centering member is advantageous in this preferred embodiment, since the centering mechanism can be further actuated by the locking mechanism in towards the closed direction. A non-planar surface of the centering member could also be used, and could be related to the other parts, such that a specific force is provided intentionally to retain differently sized objects, or to further linearize the force provided by the locking mechanism. Depending on actual manufacturing tolerances, moldability issues, and flexing during actuation, the idealized planar surface may not actual be flat, and any deviations may be acceptable to achieve the overall functionality of the locking mechanism or the cam geometry of the first tangential surface of the locking mechanism can be adjusted to account for these variations.

Figure 5:
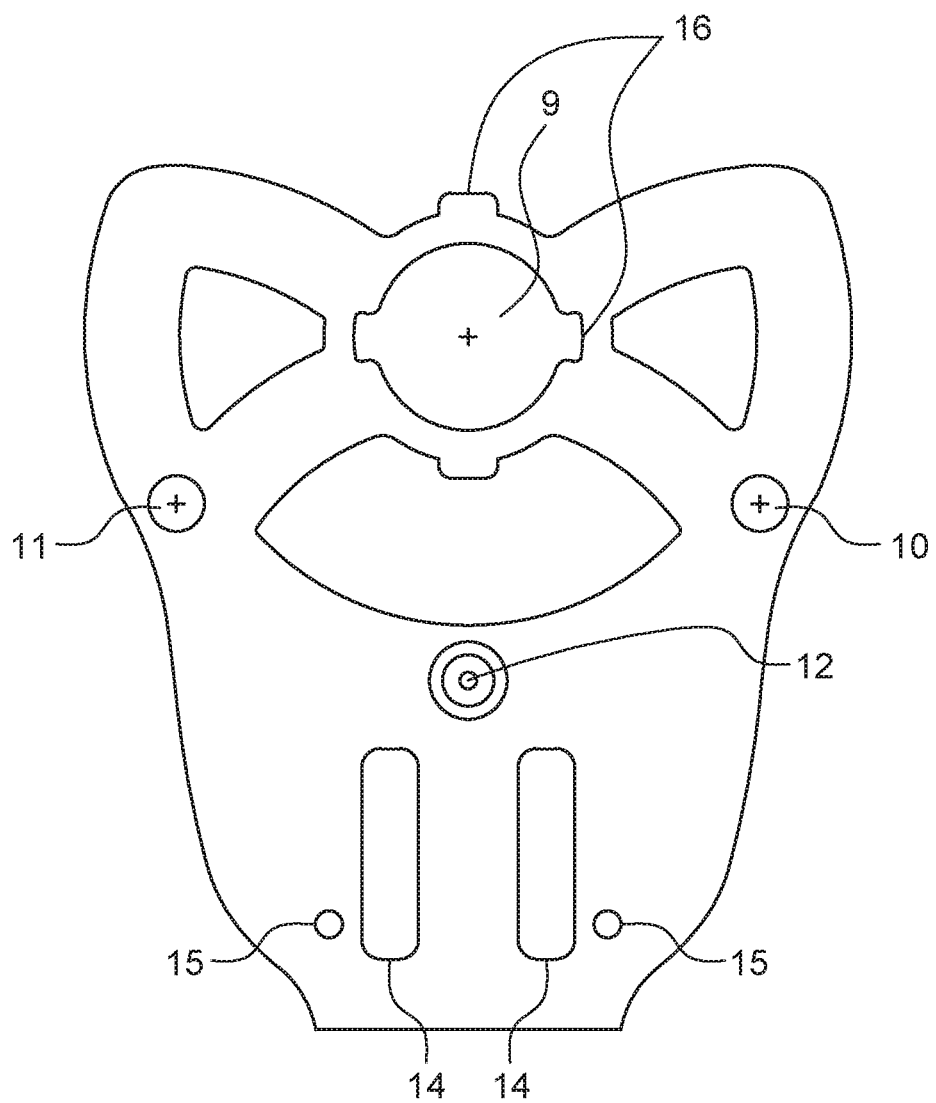
FIG. 5 is a top plan view of a main body of a second preferred embodiment.

The main body of the preferred embodiment is shown in FIG. 5, having at least two pivot axes 10, 11 for the first and second retaining members and in this embodiment, an additional axis 12 for the third and fourth retaining members. Other features can be included on the main body such as track features 14, for purposes such as retaining the centering member to the base. The track features 14 can be structured in the base, so that the movement of the centering member retained therein is restricted to movement only in a specific direction relative to the alignment axis. Other mounting areas such as 14 can also be included to retain the additional support member which retains the locking mechanism. Holes or features 15 to secure the additional support member can also be included in the main body. Visual cues such as flanged or cutout sections 16 can also be included in the main body to aid manual alignment of the main body to another device. If the centering mechanism is mounted to an electronic device or incorporates components that connect to the centering mechanism to an electronic device for purposes of mounting and aligning an optical object to an electronic device having a camera, the flanged or cutout sections can also be used as portions of mounting means for a means for adjusting the eye relief or spacing between the camera and the optical object. Eye relief is a distance between the eye or camera and the optical device, wherein the image is maximized and most ideal. Alternatively, there can be additional holes or mountings, such as but not limited to, snap-fits, screws, spring loaded mechanisms, or bayonet mounts, that hold a spacer or another type of component into the main body. A specific fixed spacer could be included into the design with various means, such as but not limited to an additional plate or body spaced a specific distance from the main body, a specific flange on the ends of the retaining arms or a specific spacer permanently mounted to the main body. The distance may also be changed by directly changing out parts of the retaining members, for example, having rubber or metal standoffs on the end of the retaining members that are removable. Removable components such as standoffs can be substituted for other components having a flanged edge or use the standoffs with a washer in a specific configuration, so as to provide a lip for the optical object to rest upon to provide the proper eye relief spacing. Furthermore, there can be adjustable means to change the spacing, wherein there is an additional body or component that moves relative from the main body discretely, ideally at controllable increments, or continuously, such that the eye relief spacing would be adjustable to the desired optimal conditions. There are other types of components that could be attachable to the main body via the additional holes or mountings, such as but are not limited to, a lens, a lens system, a filter, a polarizer, an adapter, a reticle, a pinhole, a mirror, mirror system, beamsplitter, a light source, a diffuser, a prism, a diffraction grating, or any combination thereof.

Figure 6:
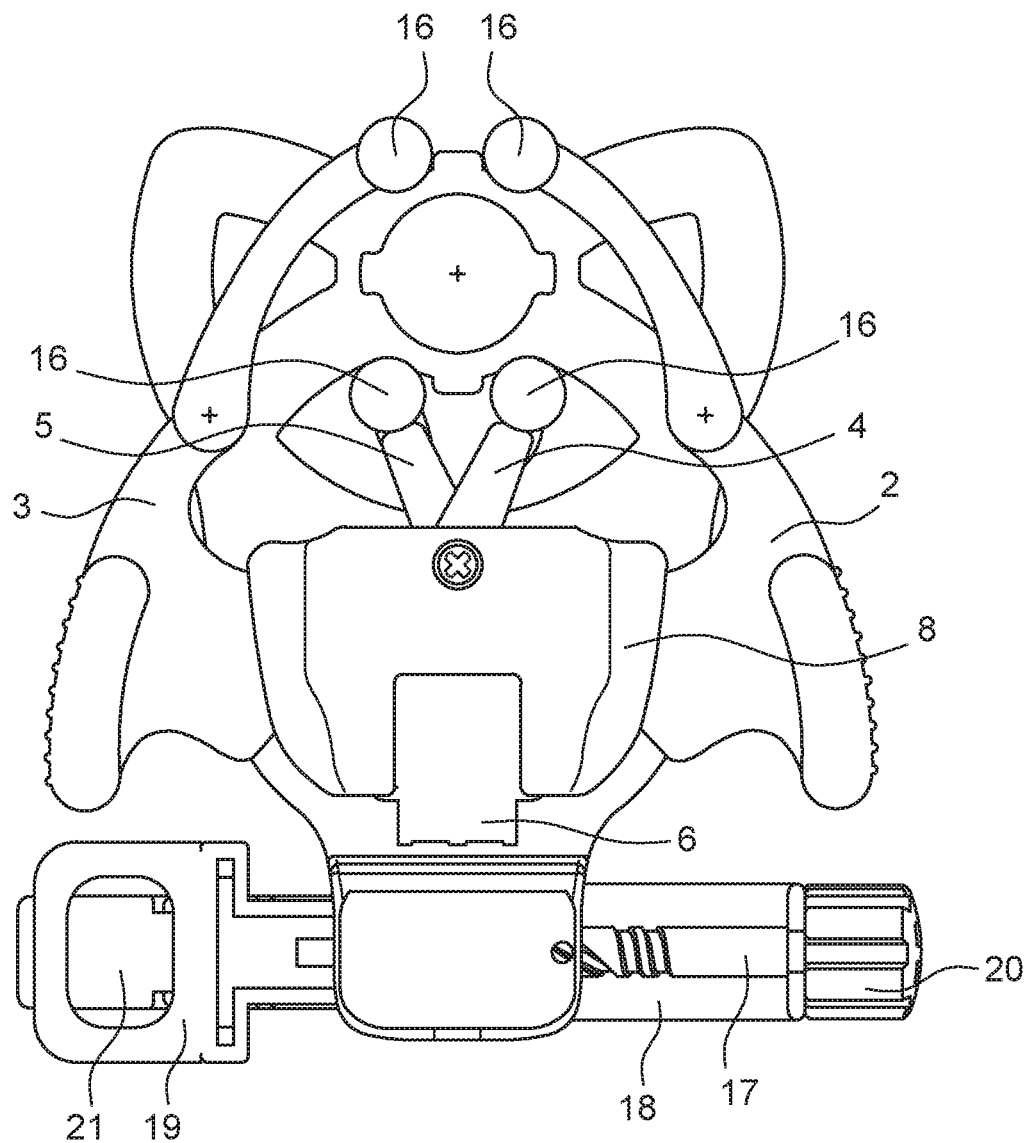
FIG. 6 is a top plan view of a third preferred embodiment of the centering mechanism constructed in accordance with the present invention, and having a clamping means in a first position.
Figure 7:
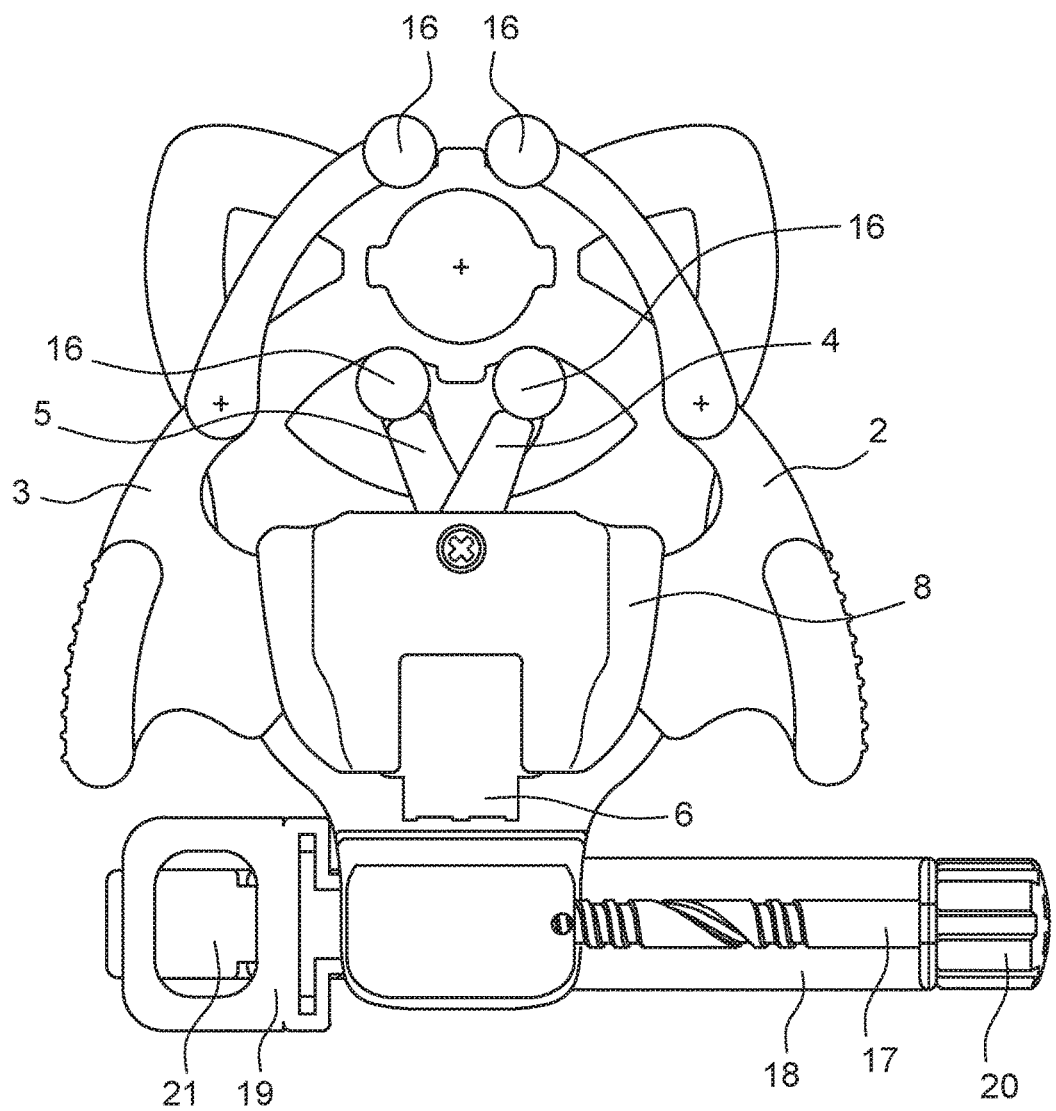
FIG. 7 is a top plan view of a third preferred embodiment of the centering mechanism constructed in accordance with the present invention, and having a clamping means in a second position.

The second embodiment of the centering mechanism in FIG. 6-10, is shown with clamping means for another device, such as an electronic device having a camera. The centering mechanism may also be used to align the object to another device, wherein an adapter or dual side clamping mechanism would be needed. In this second preferred embodiment, there is an additional clamping mechanism made up by: a first member, 18, a second member 19, at least one rotational member 21, and a variable pitch screw mechanism 17, 20. The first and second member can travel in a telescopic and linear fashion relative to each other, so that the clamping device can accommodate a varied range of sizes of devices. FIG. 6 depicts the clamping means in a first example position relative to the main body, while FIG. 7 depicts a second example position, but many positions exists due to the telescopic nature of the clamping means relative to the main body. Since the device can accommodate various sizes of devices, the combined adapter device must be able to align the clamping device to the main body. Furthermore, in the situation where electronic devices have a camera, and the centering device is used to retain and align an optical object, the alignment of the camera to the optical object must be performed. Since most phones models currently have a rear facing camera near the center plane of the phone, or towards a corner, there is some alignment regions that are not used or not popularly used. Therefore, the presented variable pitch screw is used as a component of the clamping device, whereby the coarser pitch areas are in regions corresponding to nonexistent or rare alignment positions and the finer pitch areas are in regions corresponding to common or popular alignment positions as shown in FIG. 8A-B. The variable pitch screw is operated as a cam or cam-like device, wherein there is a set screw, protrusion, spring plunger or other type of cam follower, coupled to the main body, such that the cam follower moves along in the variable screw helical track. A knob 20 portion can be included with the variable pitch screw portion 17, either as a separate part or an inherent section, for easy of manual actuation. For separate parts, the design includes a hexagonal connection to avoid accidental twisting or rotating of the knob independently of the knob, or can use other various means such as but not limited to knurling, press-fits, snap-fits and sonic bonding.

Figure 8A:
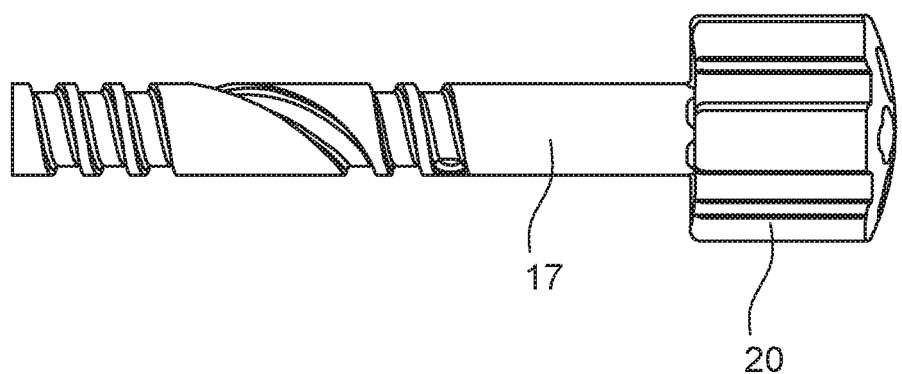
FIG. 8A is a top plan view of a variable pitch screw design of the third preferred embodiment of the centering mechanism constructed in accordance with the present invention.
Figure 8B:
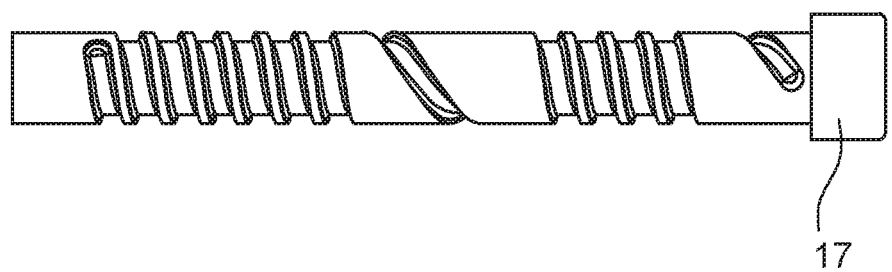
FIG. 8B is a top plan view of an additional variable pitch screw design of the third preferred embodiment of the centering mechanism constructed in accordance with the present invention.

In FIG. 8B, the pitch geometry is shown for popular smartphones to attach to the base, wherein other less popular smartphones are within the coarse pitch regions. Coarse pitch regions may be within 10-50 millimeters, and finer pitch regions within 1-10 millimeters for optimal results. Additionally, if designed for injection molding and requiring draft, the threaded region may deviate from a perfect helical cut, as needed for manufacturing, such as to have a minimal draft angle, but able to still actuate properly. Furthermore, a locking or spring loaded mechanism can be added to the variable pitch cam screw mechanism, such as but not limited to, a spring loaded screw, a cam lock, a manual screw, a lever, a compression or extension spring, and a clamp. Any locking or spring loaded mechanism on the variable pitch cam screw may provide an additional friction to hold its alignment position or to secure the alignment position for a longer period of time.

Figure 9:
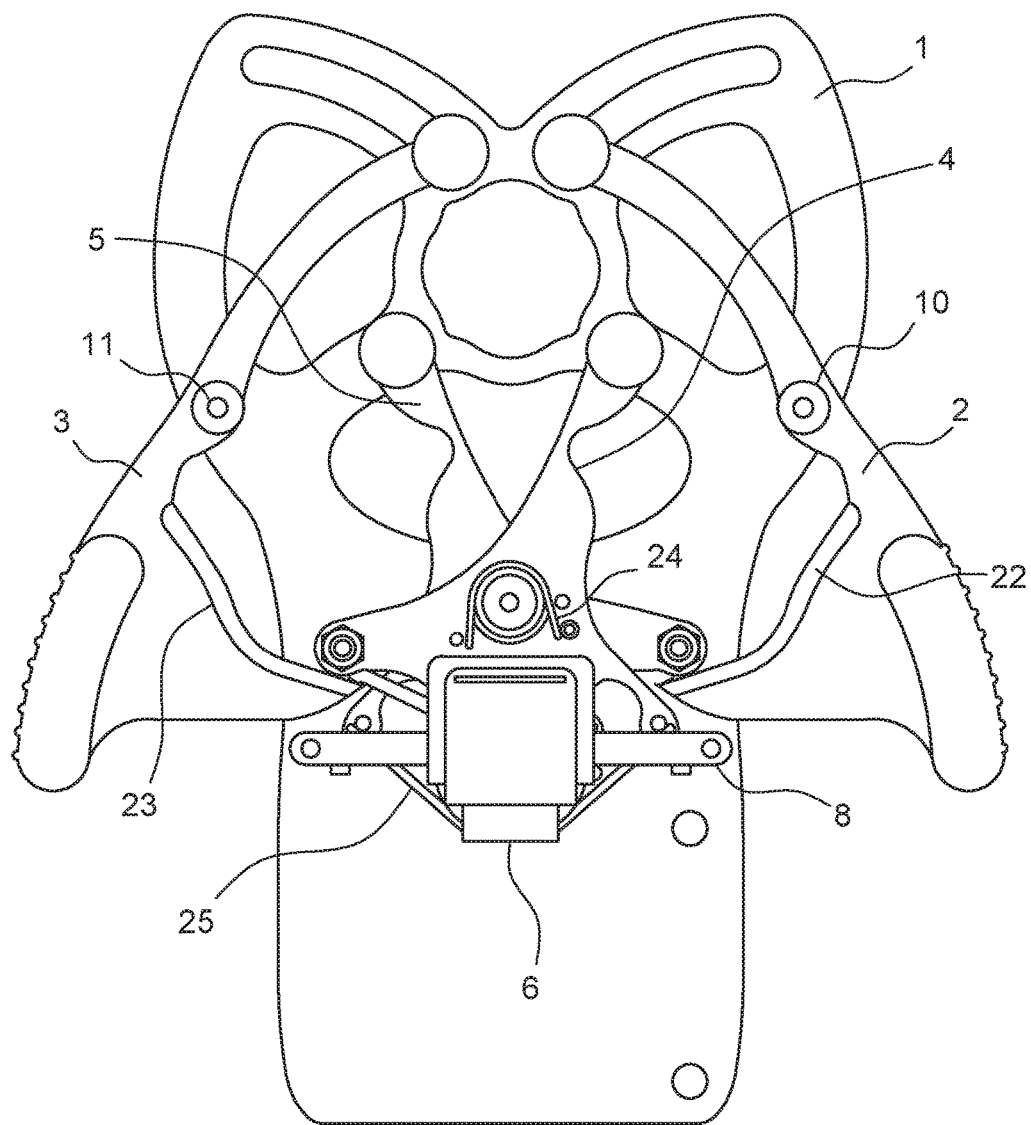
FIG. 9 is a top plan view of a fourth preferred embodiment of the centering mechanism constructed in accordance with the present invention.
Figure 9A:
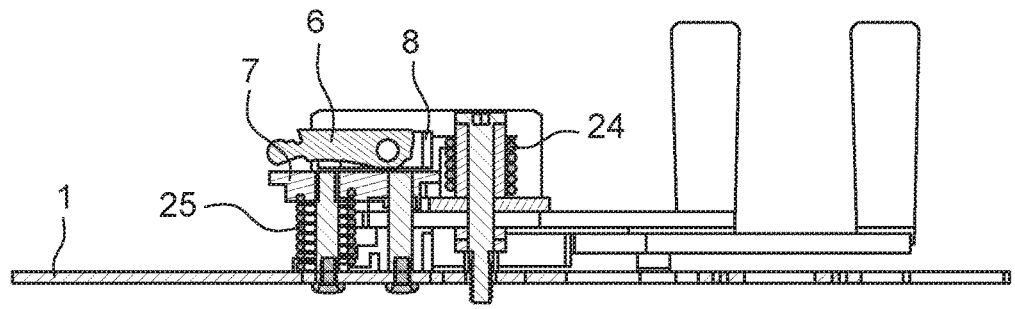
FIG. 9A is a sectional view of a fourth preferred embodiment of the centering mechanism constructed in accordance with the present invention depicting the locking mechanism in a first unlocked state.
Figure 9B:
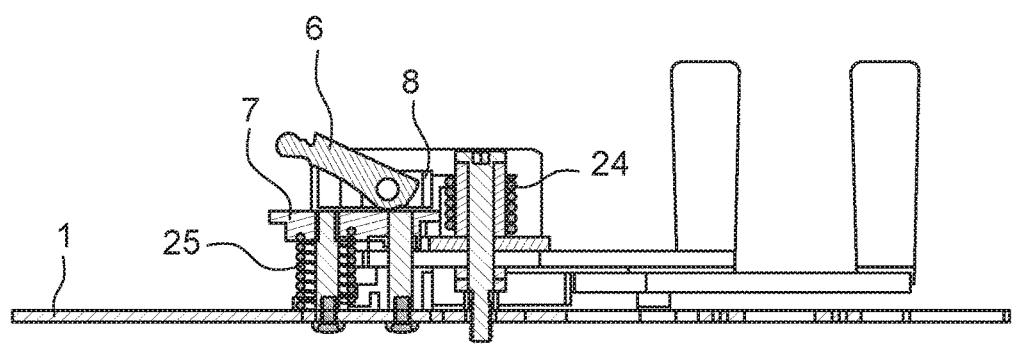
FIG. 9B is a sectional side view of a fourth preferred embodiment of the centering mechanism constructed in accordance depicting the locking mechanism in a first locked state.
Figure 9C:
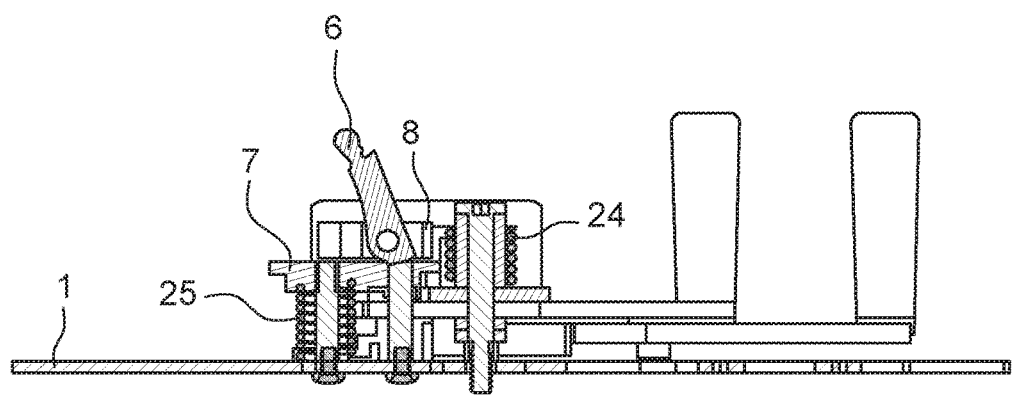
FIG. 9C is a sectional side view of a fourth preferred embodiment of the centering mechanism constructed in accordance depicting the locking mechanism in a first transitional state.
Figure 10:
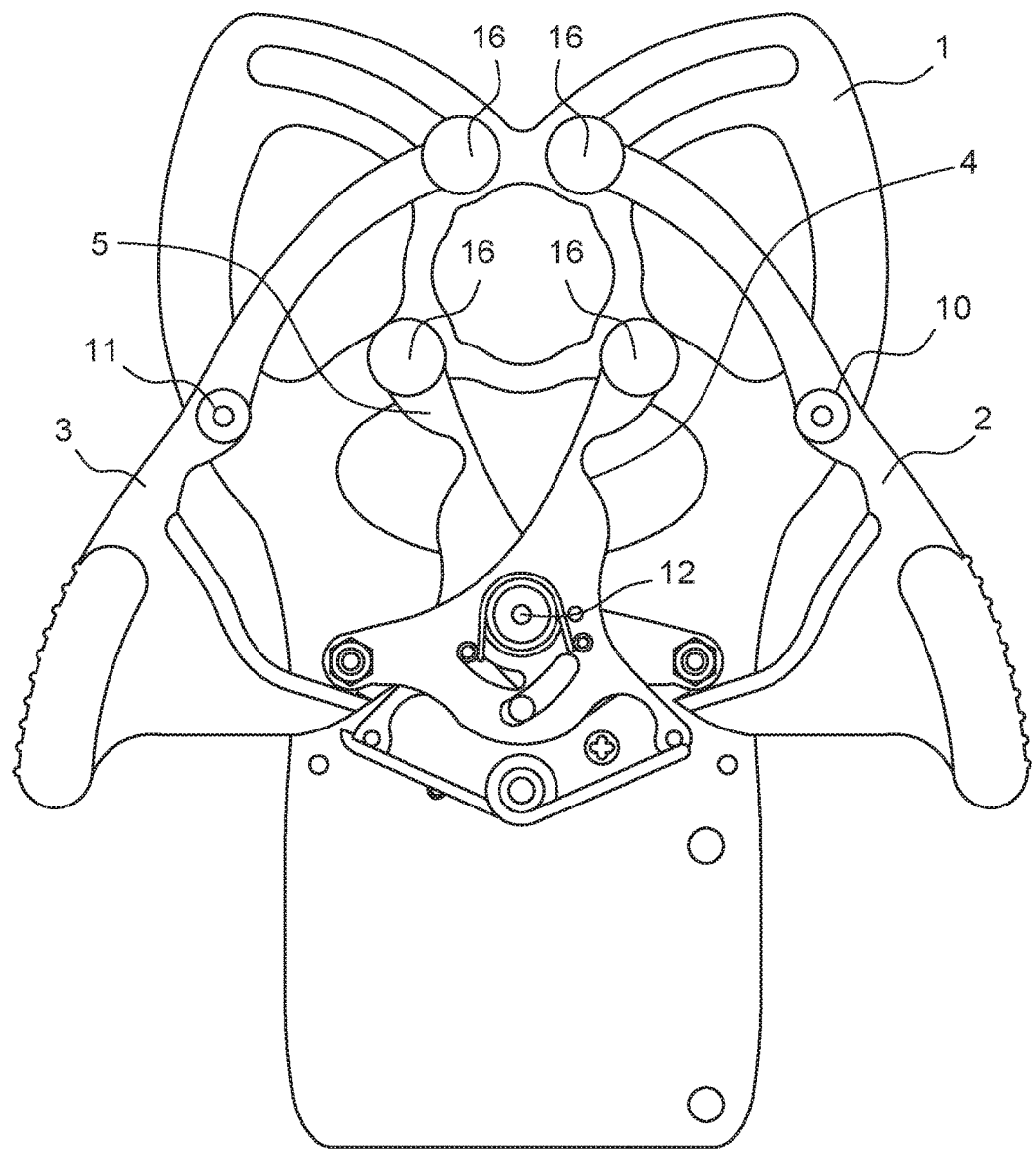
FIG. 10 is a top plan view of a fifth preferred embodiment of the centering mechanism constructed in accordance with the present invention depicting the centering mechanism in a first closed state.
Figure 11:
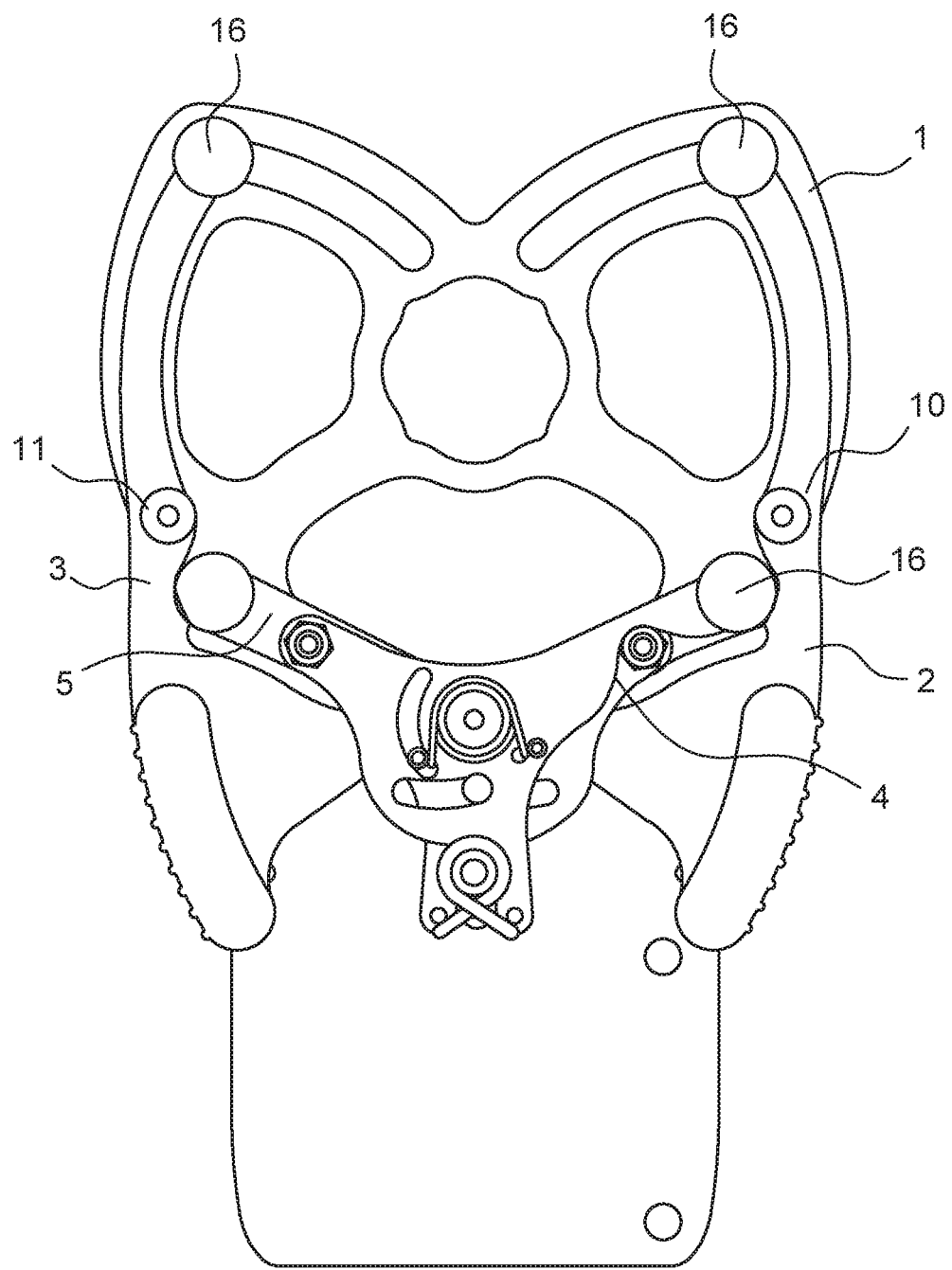
FIG. 11 is a top plan view of a fifth preferred embodiment of the centering mechanism constructed in accordance with the present invention depicting the centering mechanism in a first open state.

FIGS. 9-11 depict another embodiment of the centering mechanism having a locking mechanism having at least a first tangential surface. The additional support member 8 shown in this embodiment is a more compact and minimalistic version compared to the first embodiment, which includes basic support for the locking mechanism and means to retain the member to the main body. As shown in FIGS. 9A-C, the centering member can also have a cap or cover piece, wherein the cam actuates on the cap or cover piece instead of on the centering member directly. Additionally the locking mechanism can have a section cut out to make with a rubber grip portion, such that a rubber portion can be added to the locking mechanism for increased grip during manual actuation. In this embodiment in FIG. 9, additional members 22 and 23 may be used on the retaining members 2, 3, such that centering mechanism relies on the geometry of the additional members 22 and 23 for proper centering. Furthermore, the additional members 22 and 23 could be made out of a low friction material, is a more rigid or frictional material is needed for the retaining members 2, 3. For example, the low friction material could be a separate POM or PTFE plastic member or coating of those materials on the retaining members.

In this preferred embodiment in FIGS. 9-11, there are at least two bias members 24 and 25 which rotate about an axis 12 and another axis that is moving with the centering member 7, however more than two bias members such as two springs can be used in an analogous configuration The centering is conducted by two diverging tracks in arms 4 and 5 which follow approximately tangentially with a circular pin that can be retained or part of the centering member 7. The location of the axis of spring, the spring geometry, and the geometry of the diverging tracks in arms 4 and 5, can be balanced to achieve the desired additional force to retain the object. Additional tracks such as depicted in 5 can also be included for clearance for spring arms to provide force on the alternate retaining member 4. The additional moving spring 25, can be used to even the nonlinear force of the first spring 24, such that a more linear or exactly linear force can be obtained. This would desirable for retaining various sized objects with the same radially force. Other spring configurations can be used but this particular combination allows for additional force in a more linear fashion relative to the size of the retained object, while maintaining a more compact size relative to the main body. FIGS. 9A-C further depicts the compact nature of this dual spring design, in combination with the space required for the locking mechanism. Both FIGS. 10 & 11 show the configuration of the springs such that the centering mechanism is in a first closed and first open configuration respectively.

Additionally, the preferred embodiments of the locking mechanism 6 can be shown to move towards the main body, or away from the from main body, depending on the geometry of the desired locking mechanism, relative to the mating cam member. In the first preferred embodiment depicted in FIGS. 1-4, the locking mechanism moves in a general direction towards the main body, as it moves towards a locked position, wherein in FIGS. 10-11, the locking mechanism moves in a general direction away from the main body, as it moves towards a first locked position. Also, the general angle of the actuation depicted is approximately 90 degrees, however, for ease of use, for functional requirements, or to accommodate the ergonomics, can be any angle range from 0-360 degrees. Preferred embodiments have a range of 90 or 120 or 180 degrees for ease of use and an intuitive user experience.

Figure 12:
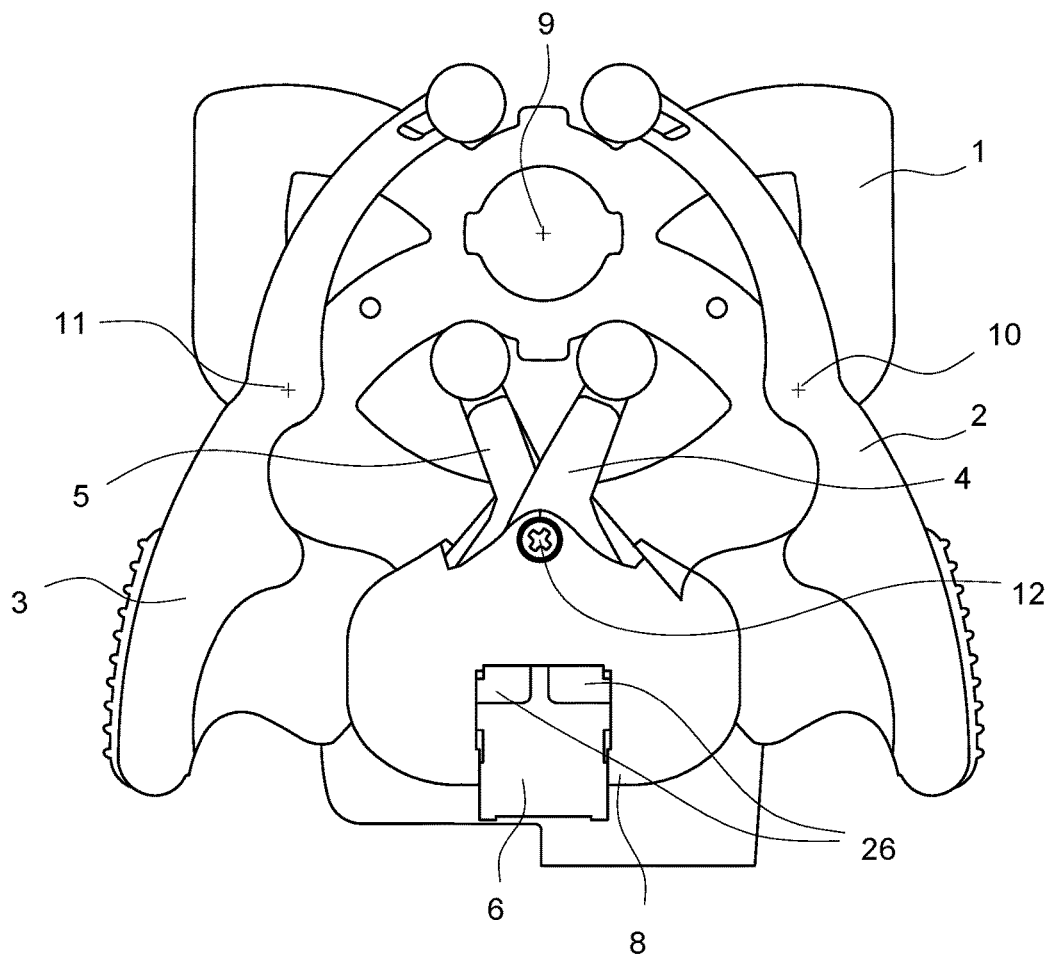
FIG. 12 is a top plan view of a sixth preferred embodiment of the centering mechanism constructed in accordance with the present invention.
Figure 13A:
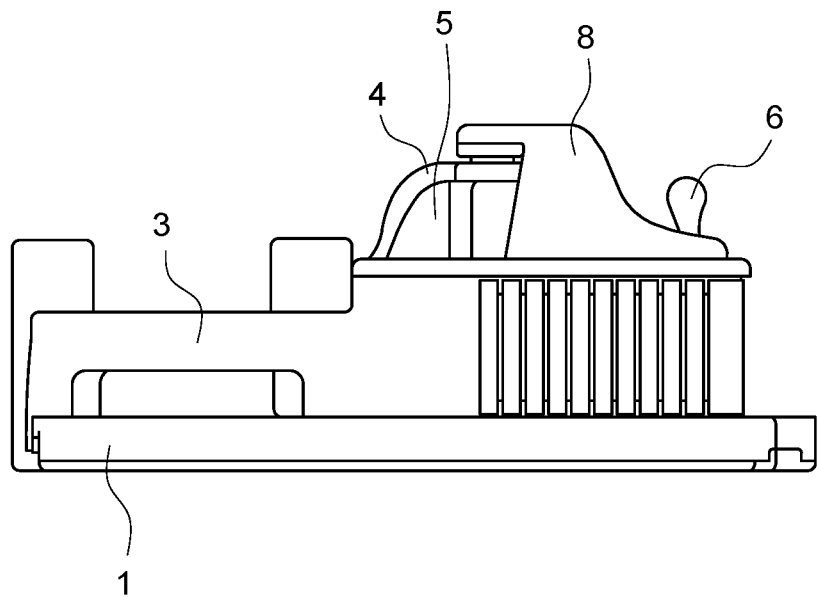
FIG. 13A is a right side view of a sixth preferred embodiment of the centering mechanism constructed in accordance with the present invention depicting the locking mechanism in a first unlocked state.
Figure 13B:
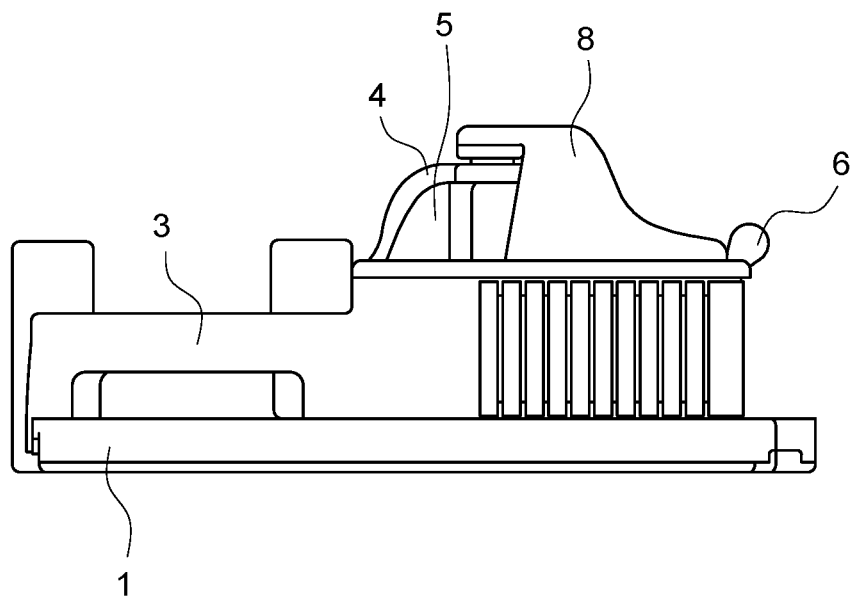
FIG. 13B is a right side view of a sixth preferred embodiment of the centering mechanism constructed in accordance with the present invention depicting the locking mechanism in a first locked state.
Figure 14A:
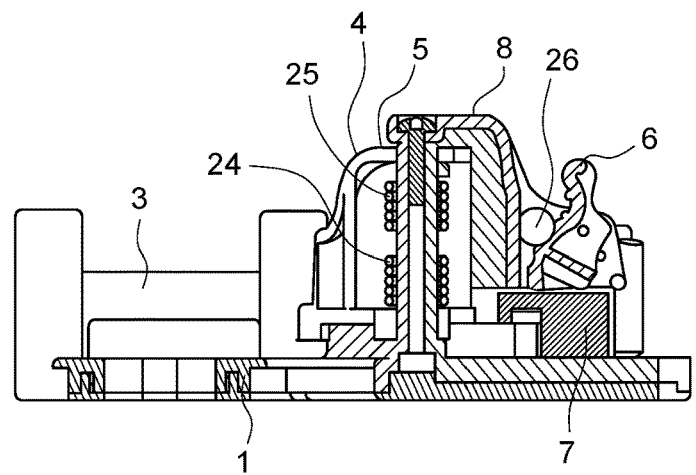
FIG. 14A is a sectional view of a sixth preferred embodiment of the centering mechanism constructed in accordance with the present invention depicting the locking mechanism in a first unlocked state.
Figure 14B:
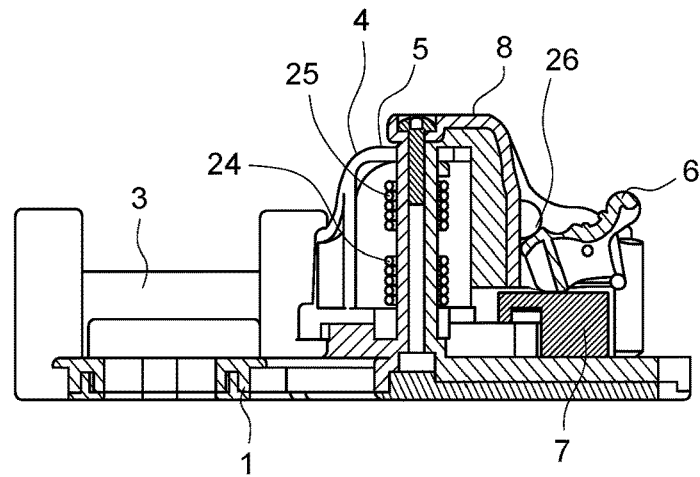
FIG. 14B is a sectional view of a sixth preferred embodiment of the centering mechanism constructed in accordance with the present invention depicting the locking mechanism in a first locked state.
Figure 14C:
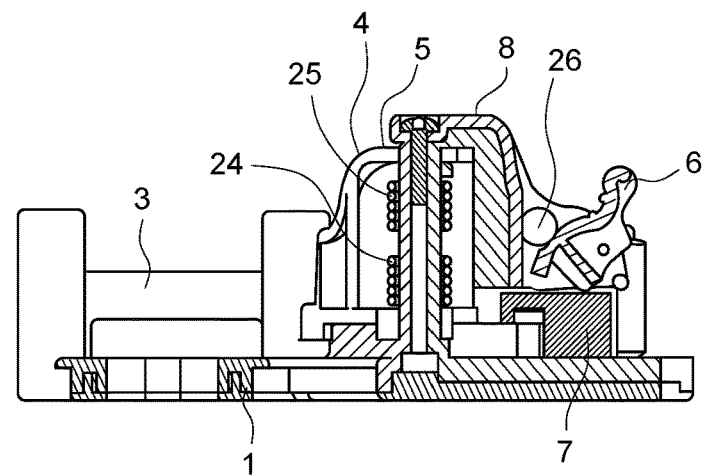
FIG. 14C is a sectional view of a sixth preferred embodiment of the centering mechanism constructed in accordance with the present invention depicting the locking mechanism in a first transitional state.
Figure 15A:
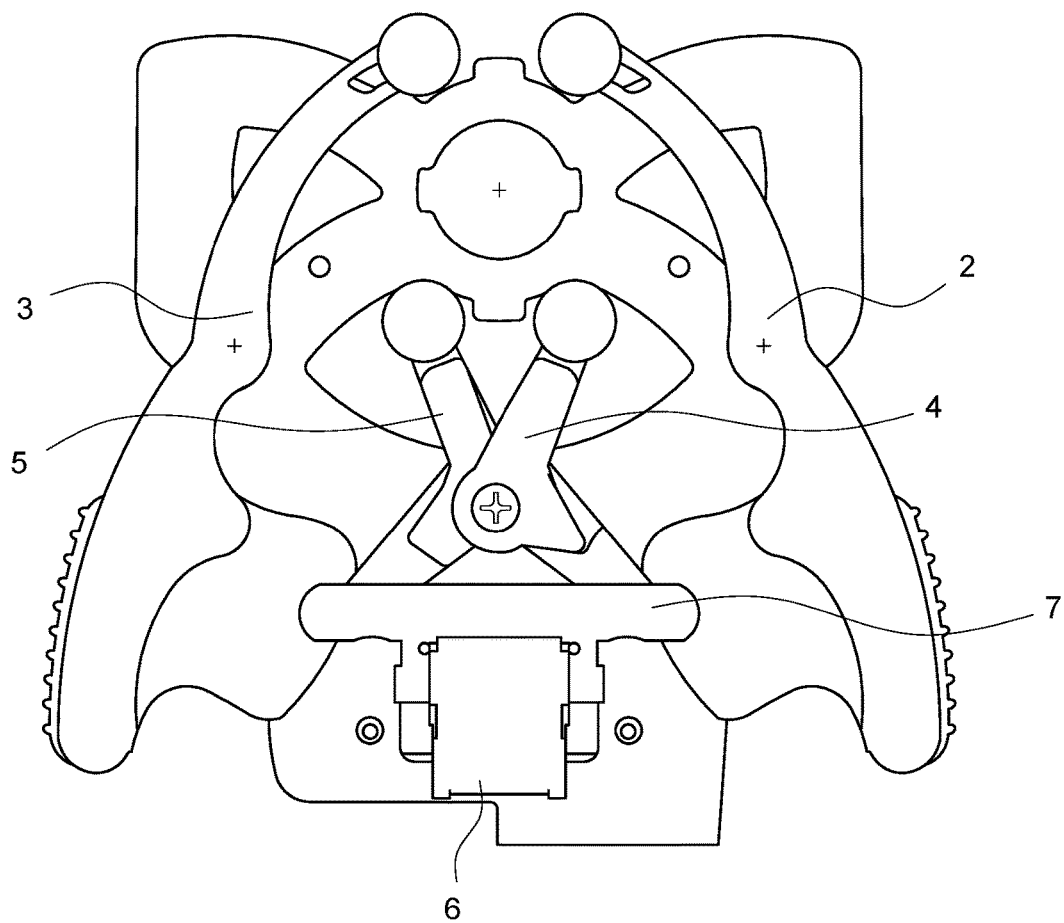
FIG. 15A is a top plan view of a seventh preferred embodiment of the centering mechanism constructed in accordance with the present invention depicting the centering mechanism in a first closed state.
Figure 15B:
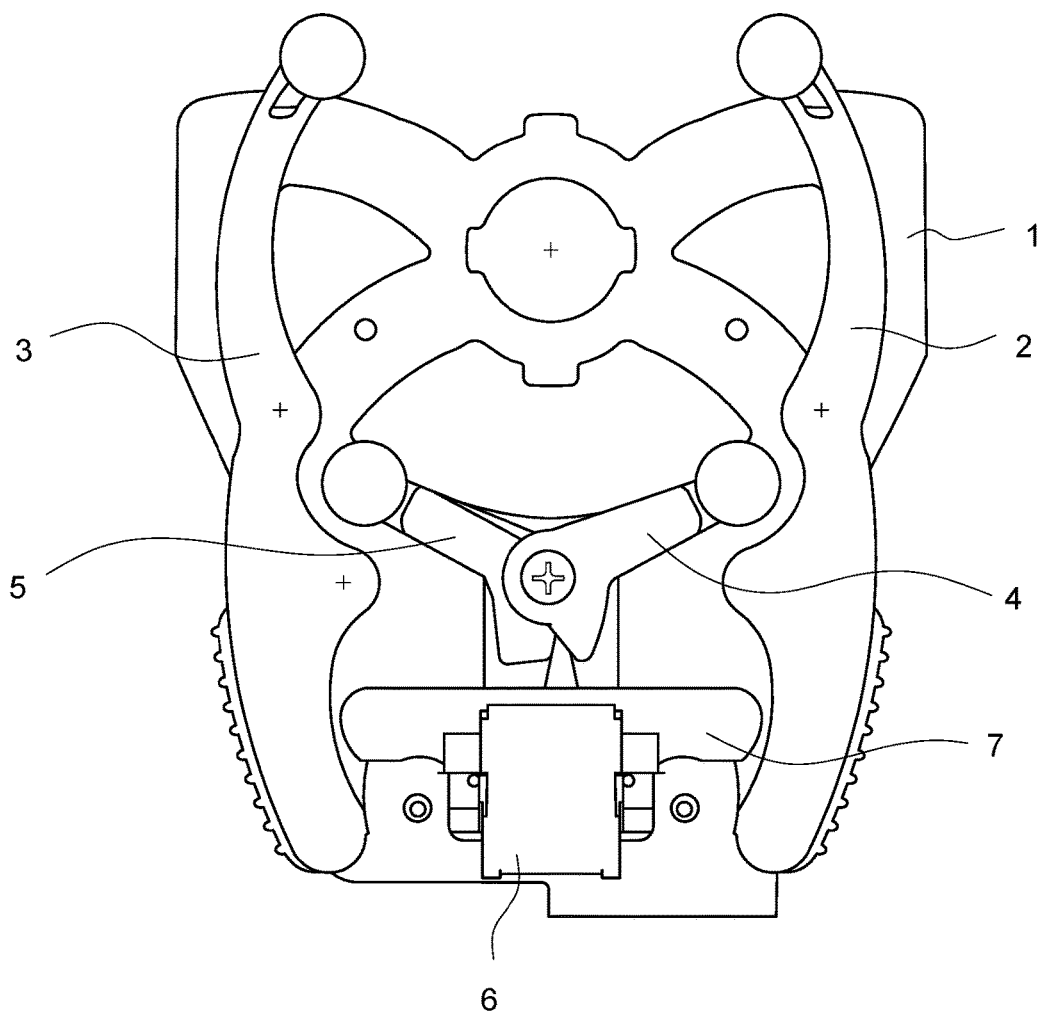
FIG. 15B is a top plan view of a seventh preferred embodiment of the centering mechanism constructed in accordance with the present invention depicting the centering mechanism in a first open state.

FIGS. 12-14 also depict the sixth preferred embodiment of the centering mechanism having at least two bias members 24 and 25, but could be used in an analogous configuration with more than two bias members or other types of bias members as opposed to springs. These springs are generally aligned along a rotational axis 12 and provide force at least directly onto arms 4 and 5. The rotational fixturing of the locking member 6 is included within the additional support member which also in this preferred embodiment acts as a cover for the mechanism. In sectional views, FIGS. 14A-C shows the first of a unlocked, locked and transitional state of the locking mechanism respectively. In FIGS. 15 A-B, the additional support member 8 is not shown in these figures for showing more details of the remainder of the mechanism; however, the centering mechanism and the locking mechanism require some additional support member 8 or another member that retains the locking mechanism so that it can function as presented.

Figure 16:
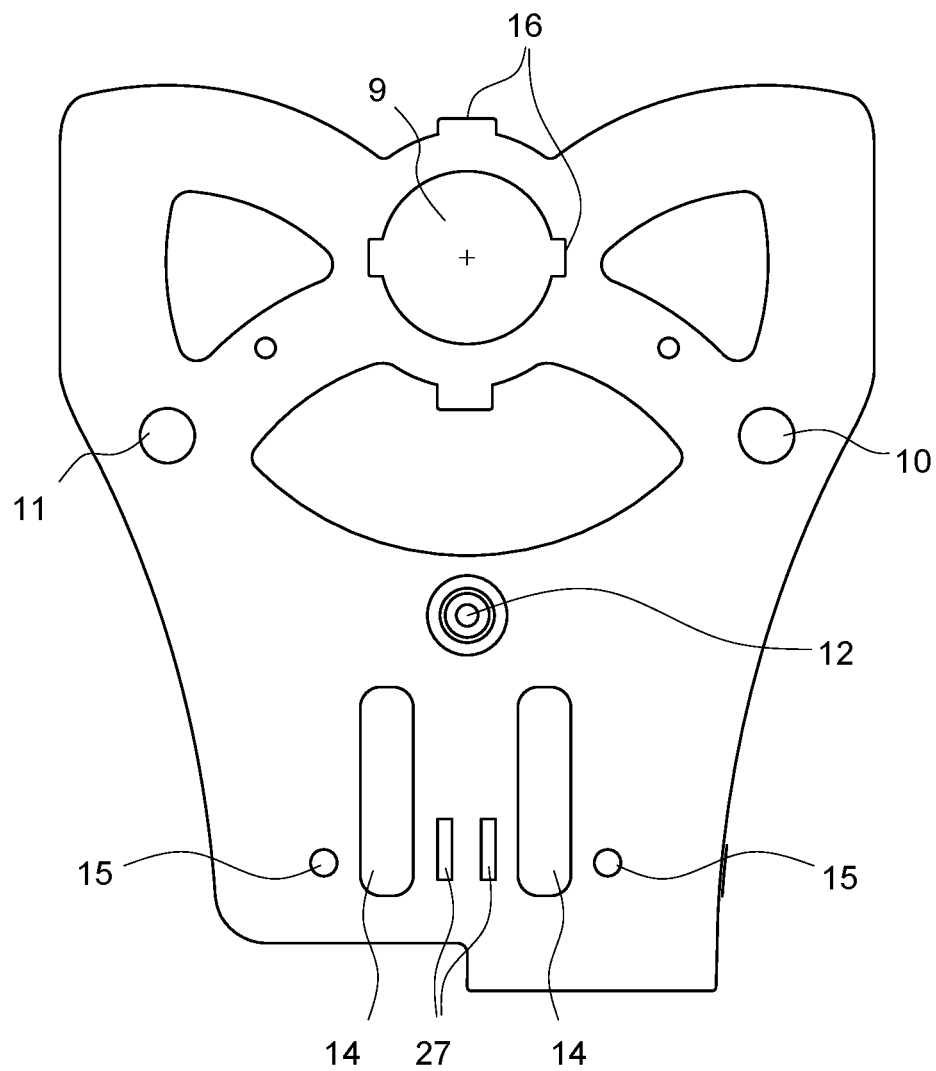
FIG. 16 is a top plan view of a main body of a seventh preferred embodiment.

In FIG. 16, the main body of the seventh preferred embodiment, having at least a support feature such as tracks 14 but also additional track members 27. In this preferred embodiment, the additional track members consist of raised walls but could be other structural members such as but not limited to, cutout slots, rack gears, ribs, or any combination thereof that provide additional support for the linear traveling motion of the centering member 7. The tracks, additional track members or the combination thereof, at least partially restrict the specific movement of the centering member in at least a first direction, and can be a part of the main body or a part that has been attached to the main body.

Figure 17:
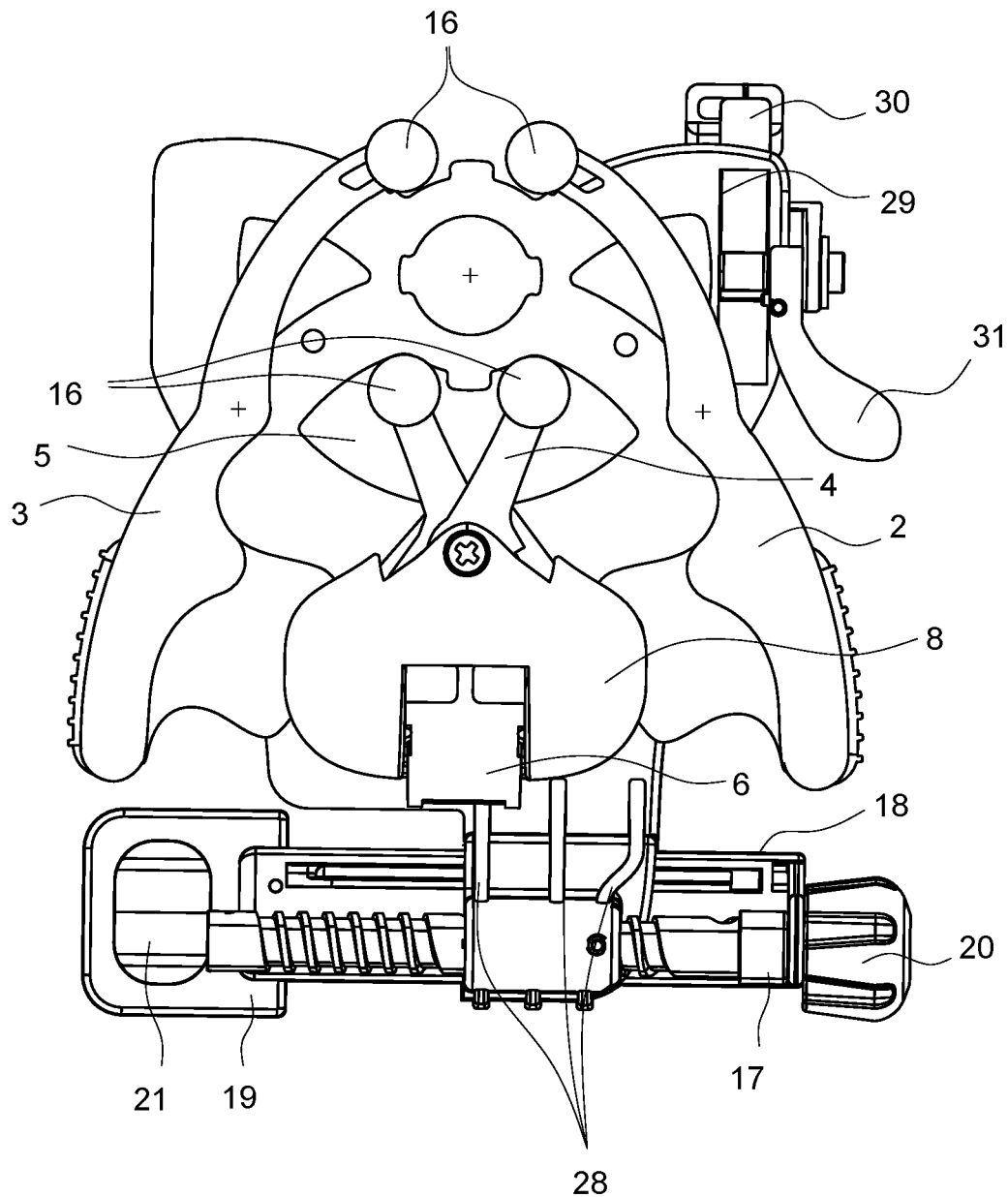
FIG. 17 is a top plan view of an eighth preferred embodiment of the centering mechanism constructed in accordance with the present invention, and having a clamping means in a first position.
Figure 18:
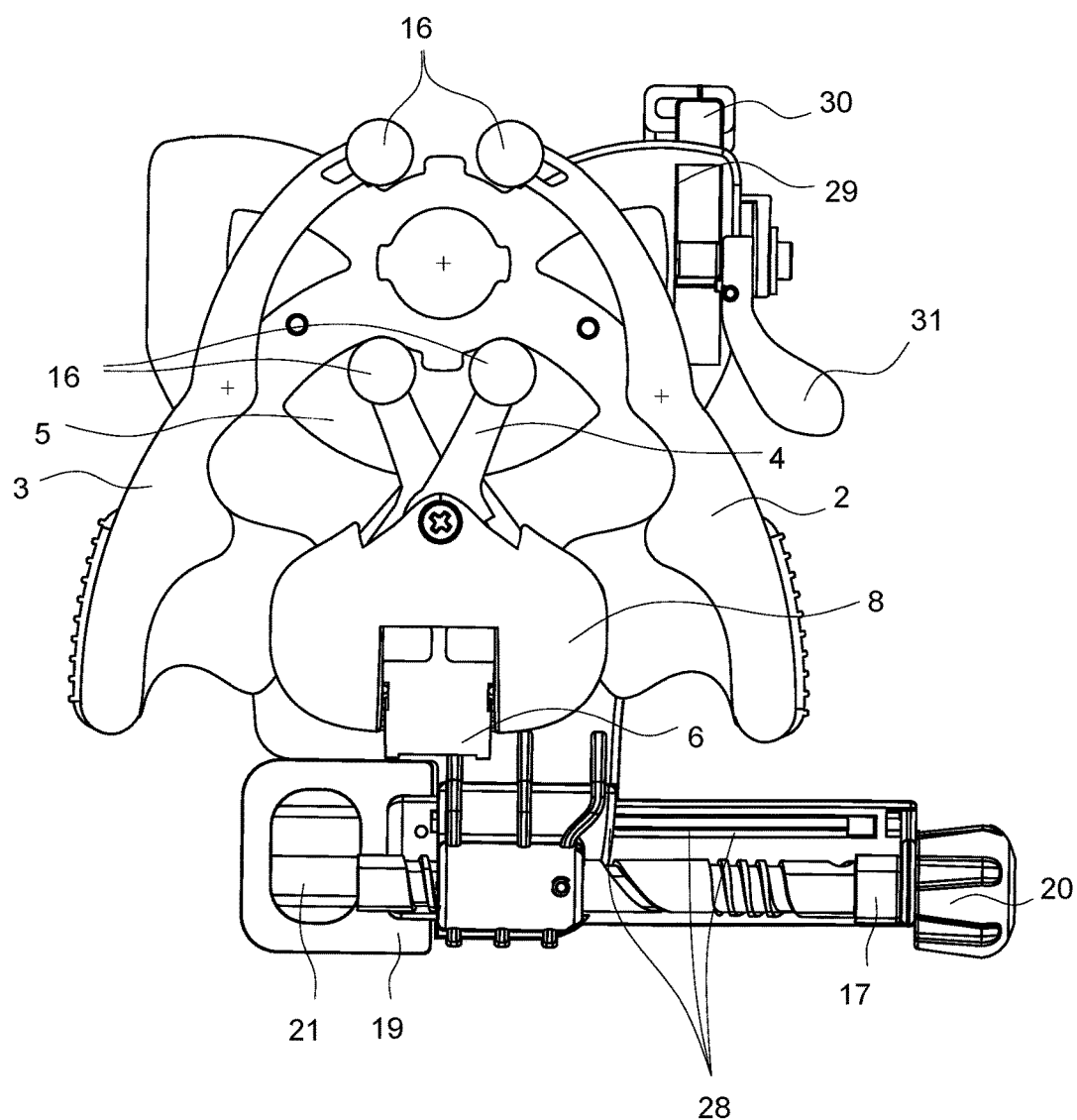
FIG. 18 is a top plan view of an eighth preferred embodiment of the centering mechanism constructed in accordance with the present invention, and having a clamping means in a second position.
Figure 19A:
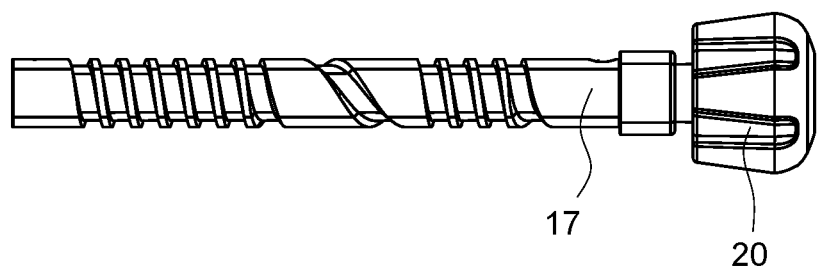
FIG. 19A is a top plan view of a variable pitch screw design of the eighth preferred embodiment of the centering mechanism constructed in accordance with the present invention.
Figure 19B:
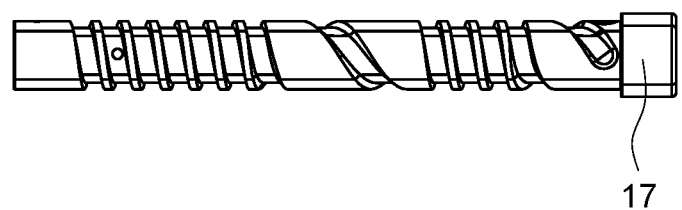
FIG. 19B is a top plan view of an additional variable pitch screw design of the eighth preferred embodiment of the centering mechanism constructed in accordance with the present invention.

In the eighth preferred embodiment depicted in FIGS. 17-19, the main body 1 has at least one additional strengthening member 28 that reinforces the joint on the main body that aligns and restricts the clamping mechanism member 18 to move in a generally linear motion. In this preferred embodiment, there is an additional alignment feature for an electronic device having a camera within the clamping mechanism. The additional alignment feature is an additional locking mechanism made up by: a first member, 30, and a second member 31 with a cam geometry that rotates about an axis relative to the first member. The rotational axis can be fixed or variable depending on the cam geometry. The first member can travel along a linear track 29 on the main body as shown, but can the track can also be curved with a mating curved portion of the second member. The purpose of the additional alignment feature of this preferred embodiment is to make contact with the top edge or surface of an electronic device, so that the feature can optionally provide additional clamping to further secure the electronic device. The additional alignment with the electronic device is achieved by first having the rotating second member in a first unlocked position. In this first unlocked position, the second member does not make surface contact with the main body 1. First, the alignment of the camera of the electronic device to the optical object is performed and the first member 30 is positioned to at least partially restrict movement of the electronic device. Next, the second member rotates to a specific angle such that the cam geometry of the second member makes contact with the surface of at least the main body, the first member or a combination thereof, in order to lock the position of the first member and to further align and additionally secure the electronic device. Once the first and second members are locked in place, the clamping mechanism retains the proper alignment of the camera of the electronic device to the optical object. Therefore, on the next use of the device, the vertical alignment of the electronic device having a camera is saved, and this alignment step may be skipped for future alignments for the same electronic device used.

To accommodate for clamping larger electronic devices having a camera with greater widths or to increase compatibility with wider cases of the electronic devices, the variable pitch screws depicted in FIGS. 9A and 9B are longer with a similarly structured variable screw helical track as compared to other preferred embodiments. The variable pitch screw 17 can be reconfigured depending on the current sizing of electronic devices on the market and their relative popularity. With the removal of the retaining screw for the variable pitch screw and the optional removal of the knob (if included), the variable pitch screw can easily switched to an updated version by the consumer if desired. This allows for ease of future compatibility of electronic devices having a camera where dimensions may not yet be known.

As it can be seen, many embodiments may be included in the above, but not limited to a centering mechanism A centering mechanism to retain an object having a center, wherein the centering mechanism comprises, a main body having at least a first alignment axis, at least two retaining members, at least one centering member having at least a first surface, at least one locking mechanism, with at least the first locking mechanism having at least, a first tangential surface, a first locked state and a first unlocked state, wherein the centering mechanism can retain an object with the center approximately aligned to at least the first alignment axis, and at least the first tangential surface directly or indirectly at least partially engages at least the first surface of at least the first centering member so that the locking mechanism further retains the object. Also, the centering mechanism can be self-centering. The centering mechanism further comprises at least one bias member. The first tangential surface of the first locking mechanism of the centering mechanism can have cam geometry. The centering mechanism may have at least the first alignment axis is fixed relative to the main body. The centering mechanism may have the main body further comprise at least two pivot axes, wherein at least the two retaining members are rotatable about their respective pivot axes. The centering mechanism wherein the pivot axes of each of the retaining members is at least approximately mutually parallel. The centering mechanism may have at least the first locking mechanism actuates the centering mechanism such that at least the first end of each of at least the two retaining members moves closer to at least the first alignment axis, as the locking mechanism transitions to at least a first locked state, is in a first locked state or a combination thereof. The centering mechanism may have at least the first locking mechanism has at least three states, a first unlocked, a first transitional and a first locked state, such that in the first unlocked state the centering mechanism moves generally freely in a centering manner, a first transitional state wherein at least the first locking mechanism begins to actuate the centering mechanism so that at least the first end of each of at least the two retaining members moves closer to at least the first alignment axis, and a first locked state where the centering mechanism is held at least partially fixed. The centering mechanism may have at least the first bias member of the centering mechanism can bias at least the first end of each of at least the two retaining members moves closer to at least the first alignment axis, and provide a clamping force when the at least the first end of at least the two retaining members make at least partial tangential contact with the object. The centering mechanism in the first unlocked state, at least the first locking mechanism allows the centering mechanism to move freely in a centering manner. The centering mechanism may have at least the first centering member joins into a single component, is an intrinsic part of, or a combination thereof, at least the two retaining members, so that at least the first end of each of at least the two retaining members move in a centering fashion. The centering mechanism may have at least the first locking mechanism provides the additional radial clamping force on the object by actuating the centering member or a cover of the centering member. A centering mechanism may have at least the first locking mechanism actuates on a planar surface of the centering member or a cover of the centering member. The centering mechanism may have at least the first locking mechanism rotates about a fixed pivot axis relative to the main body. The centering mechanism may have at least the first locking mechanism rotates about a fixed pivot axis relative to the main body, and the main body has at least a first planar surface perpendicular to the fixed alignment axis, such that the planar surface of the centering mechanism moves parallel to the first planar surface of the main body, such that at least the first locking mechanism actuates the centering mechanism with a similar force regardless of the exact size of the retained object. The centering mechanism may have at least two bias members and at least one bias member is a spring. The centering mechanism may have the second bias member moves about an additional pivot axis. The centering mechanism may have the additional pivot axis is moving relative to the main body. The centering mechanism further comprises additional support member, which retains at least the first locking mechanism. The centering mechanism may have at least one additional support member that allows at least the first locking mechanism to rotate around a pivot axis. The centering mechanism may have been designed, such that at least the first locking mechanism can rotate either towards or away from the main body to actuate the centering mechanism towards the fixed alignment axis. The centering mechanism may have at least the first locking mechanism be a cam locking mechanism. The centering mechanism may have at least the first locking mechanism have a ratcheting function. The centering mechanism may have a single design of so that it can hold circular objects having a diameter range of approximately 20 to 60 millimeters. The centering mechanism may have at least the first locking mechanism has at least one snap-fit to further secure the locking mechanism in at least one of the first locked state, the first unlocked state or the combination thereof. The centering mechanism may have at least the first tangential surface of at least the first locking mechanism has cam geometry that is designed such that the locking mechanism can be unlocked by a specific level of manual manipulation of at least one retaining member of the centering mechanism. The centering mechanism can be coupled to an adapter portion to mount and align an electronic device having at least one camera, such that the centering mechanism can retain an optical object, so as to provide a centering optical adapter for electronic devices having at least one camera. Additionally, the adapter portion may include a variable pitch screw to adjust the horizontal alignment of the camera of the electronic device. The centering mechanism may have an adapter portion that includes an additional alignment feature that has a first and second member, wherein the second member has cam geometry to allow the additional alignment feature to lock the alignment of electronic device in a vertical position.

Furthermore, there can be a centering method to retain an object having a center utilizing a centering mechanism, wherein the centering mechanism comprises, a main body having at least a first alignment axis, at least two retaining members, at least one centering member having at least a first surface, at least one locking mechanism, with at least the first locking mechanism having at least a first tangential surface, a first locked state and a first unlocked state, wherein the centering mechanism can retain an object with the center approximately aligned to at least the first alignment axis, and at least the first tangential surface directly or indirectly at least partially engages at least the first surface of the centering member so that the locking mechanism further retains the object, wherein the method comprises the steps of: pressing at least one of the first retaining member, the second retaining member, or the combination thereof, such that at least the first ends of the first and second retaining member move away from the alignment axis in a centering manner, inserting the object into the centering mechanism, pressing at least one end of at least the first locking mechanism, such that it engages in at least a first locked state, such that the object is further retained. Addition ally, the method can further comprises the steps of: pressing at least one of the first retaining member, the second retaining member, or the combination thereof, such that at least the first ends of the first and second retaining members move away from the alignment axis in a centering manner, inserting the object into the centering mechanism, pressing at least one end of at least the first locking mechanism, such that it engages in at least a first locked state, such that the object is further retained, pressing at least one of the first retaining member, the second retaining member, or the combination thereof, such that at least the first ends of the first and second retaining members move away from the alignment axis in a centering manner, wherein the pressure applied to at least the first and second retaining members disengages at least the first locking mechanism into at least a first unlocked state.

Other features may be incorporated into any of the above preferred embodiments, which increase the functionality of centering mechanism. First, the first ends 16 of each retaining member can be structured to radially pivoting inwards towards the alignment axis, so as to further retain an object held in the centering mechanism. Second, the alignment of the electronic device having a camera within the adapter portion to the alignment axis of the centering mechanism can completed by various means, such as by but not limited to, manual actuation, automatic actuation, motorized actuator, software controlled alignment, software guided alignment and by any combination thereof.

While the invention has been particularly shown and described with respect to preferred embodiments thereof, it will be understood by those skilled in the art that changes in form and details may be made therein without departing from the scope and spirit of the invention.

What is claimed is:

1. A centering mechanism to retain an object having a center, wherein the centering mechanism comprises:
    a main body having at least a first alignment axis,
    at least two retaining members, each having at least a first end and a first pressing portion,
    at least one centering member having at least a first surface,
    at least one locking mechanism engageable with the centering member, with at least the first locking mechanism having at least, a first tangential surface, a first locked state and a first unlocked state,
    wherein the centering mechanism can retain an object with the center approximately aligned to at least the first alignment axis, and at least the first tangential surface directly or indirectly at least partially engages at least the first surface of at least the first centering member so that the locking mechanism further retains the object.

2. A centering mechanism as claimed in claim 1, wherein the centering mechanism is self-centering.

3. A centering mechanism as claimed in claim 1, wherein the centering mechanism further comprises at least one bias member.

4. A centering mechanism as claimed in claim 1, wherein the first tangential surface of the first locking mechanism has cam geometry.

5. A centering mechanism as claimed in claim 1, wherein at least the first alignment axis is fixed relative to the main body.

6. A centering mechanism as claimed in claim 1, wherein the main body further comprises at least two pivot axes, wherein at least the two retaining members are rotatable about their respective pivot axes.

7. A centering mechanism as claimed in claim 6, wherein the pivot axes of each of the retaining members is at least approximately mutually parallel.

8. A centering mechanism as claimed in claim 1, wherein at least the first locking mechanism actuates the centering mechanism such that at least the first end of each of at least the two retaining members moves closer to at least the first alignment axis, as the locking mechanism transitions to at least a first locked state, is in a first locked state or a combination thereof.

9. A centering mechanism as claimed in claim 1, wherein at least the first locking mechanism has at least three states, a first unlocked, a first transitional and a first locked state, such that in the first unlocked state the centering mechanism moves generally freely in a centering manner, a first transitional state wherein at least the first locking mechanism begins to actuate the centering mechanism so that at least the first end of each of at least the two retaining members moves closer to at least the first alignment axis, and a first locked state where the centering mechanism is held at least partially fixed.

10. A centering mechanism as claimed in claim 3, wherein at least the first bias member of the centering mechanism can bias at least the first end of each of at least the two retaining members moves closer to at least the first alignment axis, and provide a clamping force when the at least the first end of at least the two retaining members make at least partial tangential contact with the object.

11. A centering mechanism as claimed in claim 1, wherein in the first unlocked state, at least the first locking mechanism allows the centering mechanism to move freely in a centering manner.

12. A centering mechanism as claimed in claim 1, wherein at least the first centering member joins into a single component, is an intrinsic part of, or a combination thereof, at least the two retaining members, so that at least the first end of each of at least the two retaining members move in a centering fashion.

13. A centering mechanism as claimed in claim 1, wherein at least the first locking mechanism provides the additional radial clamping force on the object by actuating the centering member or a cover of the centering member.

14. A centering mechanism as claimed in claim 13, wherein at least the first locking mechanism actuates on a planar surface of the centering member or a cover of the centering member.

15. A centering mechanism as claimed in claim 5, wherein at least the first locking mechanism rotates about a fixed pivot axis relative to the main body.

16. A centering mechanism as claimed in claim 15, wherein at least the first locking mechanism rotates about a fixed pivot axis relative to the main body, and the main body has at least a first planar surface perpendicular to the fixed alignment axis, such that the planar surface of the centering mechanism moves parallel to the first planar surface of the main body, such that at least the first locking mechanism actuates the centering mechanism with a similar force regardless of the exact size of the retained object.

17. A centering mechanism as claimed in claim 1, wherein there are at least two bias members and at least one bias member is a spring.

18. A centering mechanism as claimed in claim 17, wherein the second bias member moves about an additional pivot axis.

19. A centering mechanism as claimed in claim 18, wherein the additional pivot axis is moving relative to the main body.

20. A centering mechanism as claimed in claim 1, wherein the centering mechanism further comprises additional support member, which retains at least the first locking mechanism.

21. A centering mechanism as claimed in claim 20, wherein the additional support member allows at least the first locking mechanism to rotate around a pivot axis.

22. A centering mechanism as claimed in claim 1, wherein the centering mechanism can be designed, such that at least the first locking mechanism can rotate either towards or away from the main body to actuate the centering mechanism towards the fixed alignment axis.

23. A centering mechanism as claimed in claim 1, wherein at least the first locking mechanism is a cam locking mechanism.

24. A centering mechanism to retain an object having a center, wherein the centering mechanism comprises:
    a main body having at least a first alignment axis,
    at least two retaining members, each having at least a first end and a first pressing portion,
    at least one centering member having at least a first surface,
    at least one locking mechanism, with at least the first locking mechanism having at least, a first tangential surface, a first locked state and a first unlocked state and has a ratcheting function,
    wherein the centering mechanism can retain an object with the center approximately aligned to at least the first alignment axis, and at least the first tangential surface directly or indirectly at least partially engages at least the first surface of at least the first centering member so that the locking mechanism further retains the object.

25. A centering mechanism as claimed in claim 1, wherein a single design of the centering mechanism can hold circular objects having a diameter range of approximately 20 to 60 millimeters.

26. A centering mechanism as claimed in claim 1, wherein at least the first locking mechanism has at least one snap-fit to further secure the locking mechanism in at least one of the first locked state, the first unlocked state or the combination thereof.

27. A centering mechanism as claimed in claim 1, wherein at least the first tangential surface of at least the first locking mechanism has cam geometry that is designed such that the locking mechanism can be unlocked by a specific level of manual manipulation of at least one retaining member of the centering mechanism.

28. A centering mechanism as claimed in claim 1, further comprising:
    an adapter portion, where the adapter portion can mount and align the centering mechanism to an electronic device having at least one camera.

29. A centering mechanism as claimed in claim 28, wherein the adapter portion includes a variable pitch screw to adjust the horizontal alignment of the camera of the electronic device.

30. A centering mechanism as claimed in claim 28, wherein the adapter portion includes an additional alignment feature that has a first and second member, wherein the second member has cam geometry to allow the additional alignment feature to lock the alignment of electronic device in a vertical position.

31. A centering method to retain an object having a center utilizing a centering mechanism, wherein the centering mechanism comprises, a main body having at least a first alignment axis, at least two retaining members, each having at least a first end and a first pressing portion, at least one centering member having at least a first surface, at least one locking mechanism engageable with the centering member, with at least the first locking mechanism having at least a first tangential surface, a first locked state and a first unlocked state, wherein the centering mechanism can retain an object with the center approximately aligned to at least the first alignment axis, and at least the first tangential surface directly or indirectly at least partially engages at least the first surface of the centering member so that the locking mechanism further retains the object, wherein the method at least comprises the steps of:

pressing at least one of the first retaining member, the second retaining member, or the combination thereof, such that at least the first ends of the first and second retaining member move away from the alignment axis in a centering manner, inserting the object into the centering mechanism, pressing at least one end of at least the first locking mechanism, such that it at least the first locking mechanism engages in at least a first locked state, such that the object is further retained.

32. A centering method as claimed in claim 31, wherein the method further at least comprises the steps of:

pressing at least one of the first retaining member, the second retaining member, or the combination thereof, such that at least the first ends of the first and second retaining members move away from the alignment axis in a centering manner, inserting the object into the centering mechanism, pressing at least one end of at least the first locking mechanism, such that at least the first locking mechanism engages in at least a first locked state, such that the object is further retained, pressing at least one of the first retaining member, the second retaining member, or the combination thereof, such that at least the first ends of the first and second retaining members move away from the alignment axis in a centering manner, wherein the pressure applied to at least the first and second retaining members disengages at least the first locking mechanism into at least a first unlocked state.

* * * * *